US009109095B2

(12) United States Patent
Ishikawa et al.

(10) Patent No.: US 9,109,095 B2
(45) Date of Patent: *Aug. 18, 2015

(54) ORGANOSOL COMPOSITION OF FLUORINE-CONTAINING POLYMER

(75) Inventors: Takuji Ishikawa, Settsu (JP); Atsuko Tanaka, Settsu (JP); Taku Yamanaka, Settsu (JP); Nobuhiko Tsuda, Settsu (JP); Kazunobu Uchida, Settsu (JP); Takahiro Kitahara, Settsu (JP); Tomoyuki Fukatani, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 168 days.

This patent is subject to a terminal disclaimer.

(21) Appl. No.: 13/383,771

(22) PCT Filed: May 9, 2011

(86) PCT No.: PCT/JP2011/060661
§ 371 (c)(1),
(2), (4) Date: Jan. 12, 2012

(87) PCT Pub. No.: WO2012/002038
PCT Pub. Date: Jan. 5, 2012

(65) Prior Publication Data
US 2012/0123031 A1 May 17, 2012

(30) Foreign Application Priority Data

Jun. 30, 2010 (JP) ................. 2010-149717
Nov. 10, 2010 (JP) ................. 2010-252376

(51) Int. Cl.
| C08L 27/16 | (2006.01) |
| C08L 27/18 | (2006.01) |
| H01M 4/62 | (2006.01) |
| C08K 5/3415 | (2006.01) |
| C08J 3/09 | (2006.01) |
| C08J 3/00 | (2006.01) |

(52) U.S. Cl.
CPC .. C08J 3/09 (2013.01); C08J 3/005 (2013.01); C08L 27/18 (2013.01); H01M 4/623 (2013.01); C08J 2327/18 (2013.01); C08J 2427/16 (2013.01); C08K 5/3415 (2013.01); C08L 2205/02 (2013.01); Y02E 60/122 (2013.01)

(58) Field of Classification Search
CPC ....... C08L 27/16; C08L 27/18; Y02E 60/122; H01M 4/623; C08K 5/3415
USPC .......................................... 524/520, 104, 233
See application file for complete search history.

(56) References Cited

U.S. PATENT DOCUMENTS

| 4,780,490 | A | 10/1988 | Mizuno et al. |
| 5,188,764 | A | 2/1993 | Shimizu et al. |
| 5,324,785 | A | 6/1994 | Noda et al. |
| 5,886,198 | A | 3/1999 | Ogawa et al. |
| 2005/0107553 | A1* | 5/2005 | Konabe ......................... 526/247 |
| 2006/0148971 | A1* | 7/2006 | Jing et al. ....................... 524/520 |
| 2012/0107689 | A1* | 5/2012 | Takahashi et al. ............ 429/217 |

FOREIGN PATENT DOCUMENTS

| GB | 1068255 | 5/1967 |
| JP | 48-027549 | 8/1973 |
| JP | 62-109846 A | 5/1987 |
| JP | 63-284201 A | 11/1988 |
| JP | 02-158651 A | 6/1990 |
| JP | 04-154842 A | 5/1992 |
| JP | 10-053682 A | 2/1998 |
| JP | H10-233216 A * | 9/1998 |
| JP | 10-298298 A | 11/1998 |
| JP | 10-298298 A | 11/1998 |
| JP | 2003-147256 A | 5/2003 |
| JP | 2008-527081 A | 7/2008 |
| KR | 10-1998-0070867 A | 10/1998 |
| WO | 9612764 A1 | 5/1996 |

OTHER PUBLICATIONS

Product Brochure—DuPont Teflon PTFE DSIP 30 Fluoropolymer resin.*
P.L Kumler and R.A. Boyer, Molecular Basis of Transitions and Relaxations, Midland Macromolecular Monographs, Ed. Dale Meier, vol. 4, p. 239, 1978.*
Naoto et al.—JP H10-233216A—machine translation—Sep. 2, 1998.*
English translation of the International Preliminary Report on Patentability and Written Opinion of the ISA issued Feb. 12, 2013 for corresponding International Application No. PCT/JP2011/060661.

* cited by examiner

*Primary Examiner* — Ling Choi
*Assistant Examiner* — Ronald Grinsted
(74) *Attorney, Agent, or Firm* — Sughrue Mion, PLLC

(57) ABSTRACT

The present invention provides an organosol composition that is stable even in the case that the PTFE particle content is high. The present invention relates to an organosol composition of PTFE particles, comprising PTFE particles (A), a polymer (B), and an organic solvent (S), wherein (1) the polymer (B) is soluble in the organic solvent (S), (2) the amount of the PTFE particles (A) is not lower than 50% by mass of the total amount of the PTFE particles (A) and the polymer (B), and (3) the precipitation ratio of the PTFE particles after 48 hours is not higher than 60% when the total solids concentration of the PTFE particles (A) and the polymer (B) is 5% by mass.

23 Claims, No Drawings

US 9,109,095 B2

ORGANOSOL COMPOSITION OF FLUORINE-CONTAINING POLYMER

CROSS REFERENCE TO RELATED APPLICATIONS

This application is a National Stage of International Application No. PCT/JP2011/060661, filed on May 9, 2011, which claims priority from Japanese Patent Application No. 2010-149717 filed on Jun. 30, 2010 and from Japanese Patent Application No. 2010-252376 filed on Nov. 10, 2010, the contents of all of which are incorporated herein by reference in their entirety.

TECHNICAL FIELD

The present invention relates to an organosol composition in which the polytetrafluoroethylene (PTFE) particle content is increased.

BACKGROUND ART

An organosol containing fibril-forming high-molecular-weight PTFE particles dispersed in an organic solvent is useful as an electrode mixture for producing electrodes of electric storage devices such as lithium cells.

Such An organosol of high-molecular-weight PTFE particles tends to have very low stability when containing the PTFE particles at a high concentration, and therefore the highest concentration thereof is as low as 25% by mass if the stability needs to be maintained. For this reason, attempts have been made to modify PTFE so as to produce a high-concentration organosol.

In this context, Patent Documents 1 to 4 each disclose a method employing core-shell particles each having a core of fibril-forming high-molecular-weight PTFE and a shell of non-fibril-forming polymer. Also, Patent Document 5 teaches a method of modifying PTFE by copolymerization with a very small amount of an acrylic monomer having a polyfluoroalkyl group.

Still, the proportion of the modified PTFE particles in an organosol obtained in those Patent Documents is up to 30% by mass.

Meanwhile, combination use of PTFE particles and other fluororesins has also been proposed. For example, Patent Document 6 teaches a method in which unmodified PTFE and a tetrafluoroethylene (TFE)-hexafluoropropylene (HFP) copolymer (FEP) are used in combination. Patent Document 7 teaches an aqueous dispersion or organosol of a mixture of high-molecular-weight PTFE and FEP or PFA. Patent Document 8 teaches an organosol in which particles of a crystalline fluoropolymer such as high-molecular-weight PTFE and an amorphous fluororesin such as a vinylidene fluoride (VdF) polymer are mixed.

The ratio of PTFE/FEP, however, is at most 30/70 (mass ratio) in Patent Document 6, and a ratio higher than that causes agglomeration. Further, the organosol of Patent Document 7 contains only unmodified PTFE in an amount of 10% by mass or less. Although Patent Document 7 mentions a mixture containing unmodified PTFE and PFA at a mass ratio of 50/50, such a mixture is available only in an aqueous dispersion.

The organosol of Patent Document 8 is produced by a latex mixing method of mixing a latex of PTFE particles and a latex of amorphous or low-crystalline fluororesin particles, coagulating and drying the mixture, and dispersing the dried mixture in an organic solvent, or by a dry-blending method of blending dried PTFE particles and dried amorphous fluororesin particles and then dispersing the blended particles in an organic solvent. Here, the dry blending enables production of an organosol containing PTFE in an amount of more than 50% by mass of the solids, but the dry-blended PTFE particles are agglomerated or fibrillated to have large particle sizes and thus do not exist as primary particles, which means that such an organosol lacks stability. On the other hand, in the organosol obtained by latex mixing, the generation rate of secondary particles is still high, which is similar to a conventional one, and the PTFE particle content should be not higher than 20% by mass to allow the organosol to have excellent precipitation stability.

Patent Document 1: JP S62-109846 A
Patent Document 2: JP H2-158651 A
Patent Document 3: JP H4-154842 A
Patent Document 4: WO 96/012764
Patent Document 5: JP S63-284201 A
Patent Document 6: JP S48-27549 B
Patent Document 7: JP H10-53682 A
Patent Document 8: JP 2008-527081 T

SUMMARY OF THE INVENTION

Problems to be Solved by the Invention

In the case of preparing an organosol of PTFE particles by any of the conventional methods, an amount of PTFE particles exceeding 30% by mass causes PTFE particles to agglomerate, giving an unstable organosol. Even in the case of a stable organosol containing 30% by mass or less of PTFE, the problem is unavoidable in which the PTFE particles are agglomerated or fibrillated when shear-mixed with an electrode active material and the like to form an electrode mixture slurry, for example, or further mixed with an auxiliary binder solution.

The present invention is aimed to provide an organosol composition that is stable even in the case that the PTFE particle content is high.

Means for Solving the Problems

Namely, the present invention relates to an organosol composition of polytetrafluoroethylene particles, comprising polytetrafluoroethylene particles (A), a polymer (B), and an organic solvent (S), wherein (1) the polymer (B) is soluble in the organic solvent (S),
(2) the amount of the polytetrafluoroethylene particles (A) is not lower than 50% by mass of the total amount of the polytetrafluoroethylene particles (A) and the polymer (B), and
(3) the precipitation ratio of the polytetrafluoroethylene particles after 48 hours is not higher than 60% when the total solids concentration of the polytetrafluoroethylene particles (A) and the polymer (B) is 5% by mass.

Further, the present invention relates to an organosol composition of polytetrafluoroethylene particles, comprising polytetrafluoroethylene particles (A), a polymer (B), and an organic solvent (S), wherein (1) the polymer (B) is soluble in the organic solvent (S), and
(2) the organosol composition has an ultrasonic attenuation spectrum with a slope of not less than +0.50, the ultrasonic attenuation spectrum being obtained from an attenuation factor of the organosol composition having a solids concentration of 12% by mass, the attenuation factor being measured by an ultrasonic attenuation method at a frequency of 3 to 100 MHz.

The present invention also relates to an organosol composition of polytetrafluoroethylene particles, comprising polytetrafluoroethylene particles (A), a polymer (B), and an organic solvent (S), wherein (1) the polymer (B) is soluble in the organic solvent (S), and (2) the organosol composition has a rate of change of saturated infrared transmittance is not higher than 5.0%, the rate of change of saturated infrared transmittance being determined from an infrared light intensity of the organosol composition having a solids concentration of 5% by mass, the infrared light intensity being measured while the organosol composition is centrifuged under conditions of an optical path length of 2.2 mm, a centrifugal force of 2300 G, and a temperature of 25° C.

The present invention further relates to a method for producing an organosol composition of fluororesin particles (X) insoluble in an organic solvent (S), the method comprising the steps of:

(I) mixing an aqueous dispersion of fluororesin particles (X) insoluble in an organic solvent (S) and an aqueous dispersion of a polymer (B) soluble in the organic solvent (S);

(II) adding a water-soluble organic solvent (D) for coagulation to the obtained mixed aqueous dispersion to coagulate the fluororesin particles (X) insoluble in the organic solvent (S) and the polymer (B);

(III) separating the obtained hydrous coagulum (E) of the fluororesin particles (X) insoluble in the organic solvent (S) and the polymer (B) from the liquid layer;

(IV) mixing and stirring the obtained hydrous coagulum (E) and the organic solvent (S) to disperse the hydrous coagulum (E); and (V) removing water from the obtained hydrous organic dispersion (F).

Effect of the Invention

The PTFE organosol composition of the present invention stably contains PTFE particles and has excellent characteristics which allow a coating layer containing the PTFE organosol composition of the present invention as a binder to have enhanced adhesion to a substrate.

MODES FOR CARRYING OUT THE INVENTION

The PTFE organosol composition of the present invention is an organosol composition of PTFE particles, comprising PTFE particles (A), a polymer (B), and an organic solvent (S), wherein (1) the polymer (B) is soluble in the organic solvent (S), (2) the amount of the PTFE particles (A) is not lower than 50% by mass of the total amount of the PTFE particles (A) and the polymer (B), and (3) the precipitation ratio of the PTFE particles after 48 hours is not higher than 60% when the total solids concentration of the PTFE particles (A) and the polymer (B) is 5% by mass.

Hereinafter, the components and requirements are each described in detail.

(A) PTFE Particles

PTFE preferably has a standard specific gravity (SSG) of 2.130 to 2.230, and may be a fibril-forming one or a non-fibril-forming one.

Since PTFE cannot be melt-processed and is fibrillated, the molecular weight thereof cannot be determined by a common molecular weight determination method such as gel permeation chromatography (GPC). This is the reason that the standard specific gravity (SSG) has been used as a measure of the molecular weight. Standard specific gravity is defined in ASTM D4895-89, and a smaller value indicates a larger molecular weight. For example, the unmodified PTFE in Patent Document 6 has a standard specific gravity of 2.20 to 2.29.

The PTFE used in the present invention preferably has a standard specific gravity of 2.230 or lower, and more preferably 2.130 to 2.200. If the standard specific gravity exceeds 2.230, i.e., if the molecular weight is low, PTFE is less likely to be fibrillated. High-molecular-weight PTFE having a standard specific gravity of less than 2.130 still has its essential fibril-forming ability, but is difficult to be produced and is thus impractical.

The fibril-forming ability can also be evaluated based on another criterion, the melt viscosity (ASTM 1238-52T) at 380° C. PTFE is roughly regarded as "non-fibril-forming" herein if it has a melt viscosity at 380° C. of $1 \times 10^7$ poise or lower, and preferably $1 \times 10^6$ poise or lower. The minimum melt viscosity thereof is usually $5 \times 10^2$ poise.

The fibril-forming ability can also be evaluated based on yet another criterion, the melt extrusion pressure. A high melt extrusion pressure indicates a high fibril-forming ability, and a low melt extrusion pressure indicates a low fibril-forming ability. In the present invention, PTEF is roughly regarded as "non-fibril-forming" if it has a cylinder extrusion pressure at a reduction ratio of 1600 of preferably 70 MPa or lower, more preferably 60 MPa or lower, and still more preferably 50 MPa or lower, considering that such PTFE is less likely to agglomerate in the course of organosol composition production. The minimum value thereof is usually 5 MPa, but is not particularly limited and can be appropriately set according to the application or the intended use.

(A1) Fibril-forming PTFE

Fibril-forming PTFE is a high-molecular-weight homopolymer of TFE (commonly, SSG of 2.230 or lower) and is typified by PTFE not being modified (hereinafter also referred to as "unmodified PTFE"). As above, fibril-forming PTFE is PTFE in the form of particles that have been difficult to be contained in an organosol at a high concentration.

(A2) Non-fibril-forming PTFE

Whether PTEF is a non-fibril forming one can be determined using the above criteria. Specific examples thereof include monomer-modified PTFE prepared by copolymerization with 2% by mass or less of a monomer for modification as mentioned in Patent Document 5 or the like; low-molecular-weight (high SSG) PTFE; and core-shell composite particles each having a core of fibril-forming PTFE and a shell of non-fibril-forming resin as described in documents such as Patent Documents 1 to 4.

In the organosol composition of the present invention, PTFE particles, regardless of being fibril-forming or non-fibril-forming, are considered to exist as primary particles in an organosol. Here, the "existing as primary particles in an organosol" does not require all the PTFE particles to be primary particles, and only requires that the PTFE particles be stable in an organosol ("the precipitation ratio of the PTFE particles after 48 hours is not higher than 60% by mass" as later described) when the amount of the PTFE particles (A) (the amount of the PTFE particles (A) relative to the total amount of the PTFE particles (A) and the polymer (B), hereinafter, the term is defined as the same) is 50% by mass or higher. Hence, this condition means that few agglomerated PTFE particles (PTFE particles having a particle size of 5 μm or larger) exist though not clearly defined. In other words, the particles contained in the composition preferably have an average particle size of 5 μm or smaller, and more preferably 1 μm or smaller in the particle size measurement by a light scattering method. Further, it is considered that PTFE particles constituting 30% by mass or more, or even 50% by mass or more of the total amount of the PTFE particles may preferably be primary particles.

The PTFE particles in a PTFE aqueous dispersion used preferably have an average primary particle size in the range of 50 to 500 nm, in terms of better stability and redispersibility of the organosol. The average primary particle size is more preferably 50 to 400 nm, and still more preferably 100 to 350 nm.

In the case of being mixed with other materials, the PTFE particles preferably have a small average primary particle size because such PTFE particles can be readily mixed and uniformly dispersed. The average primary particle size thereof is preferably 50 to 400 nm, more preferably 50 to 300 nm, and still more preferably 50 to 250 nm.

More specifically, the average primary particle size of PTFE particles is preferably small in terms of preparing a more homogeneous electrode mixture slurry and is preferably in the range of 50 to 400 nm, more preferably 50 to 300 nm, and still more preferably 50 to 250 nm when the particles are mixed, for example, with a carbon material such as natural graphite, artificial graphite, and activated carbon; a conductive carbon material such as acetylene black and ketjen black; or a positive electrode material such as a lithium-containing transition metal complex oxide and a lithium-containing phosphate which are used for lithium secondary cells, lithium ion capacitors and the like.

The organosol can be produced using a PTFE aqueous dispersion whether or not the dispersion contains a dispersion stabilizer. Also, the following commercially available PTFE aqueous dispersions can be used, for example: DYNEON (registered trademark) TF 5032 PTFE, DYNEON (registered trademark) TF 5033 PTFE, DYNEON (registered trademark) TF 5035 PTFE, and DYNEON (registered trademark) TF 5050 PTFE produced by Dyneon, LLC; TEFLON (registered trademark) PTFE GRADE 30 and TEFLON (registered trademark) PTFE GRADE 307A produced by E. I. du Pont de Nemours & Co.; and Polyflon (registered trademark) D-1E and Polyflon (registered trademark) D-210C produced by Daikin Industries, Ltd.

The organosol composition of the present invention can contain fibril-forming PTFE particles at a high concentration in a stable state although it used to be difficult for an organosol to contain such PTFE particles at a high concentration.

The organosol composition of the present invention is preferably free from a tetrafluoroethylene (TFE)-hexafluoropropylene (HFP) copolymer (FEP).

(B) Polymer

The polymer (B) is not particularly limited as long as it dissolves in an organic solvent (S) which is one of the components constituting the organosol composition. The polymer (B) may be a fluororesin or fluororubber (B1), or may be a fluorine-free resin or fluorine-free rubber (B2). The polymer (B) can be appropriately selected depending on the kind of the organic solvent (S), and the application and the production conditions of the organosol composition.

Examples of the fluororesin or fluororubber (B1) include VdF polymers, fluorine-containing acrylic polymers, and fluorine-containing methacrylic polymers. Here, perfluoro polymers including PTFE, FEP, and the like do not substantially dissolve in an organic solvent (S), and therefore are not included in the polymer (B).

The polymer (B) is preferably a resin, and more preferably a fluororesin. Particularly, the polymer (B) is preferably a VdF polymer.

The VdF polymer may be a VdF homopolymer (PVdF) or a VdF copolymer. The monomer copolymerizable with VdF may be one or two or more selected from, for example, TFE, HFP, perfluoro (alkyl vinyl ether) (PAVE), CTFE, $CF_2$=CFH, and $CH_2$=CFRf (Rf is a C1 to C10 perfluoroalkyl group).

The polymer (B) is more preferably a VdF copolymer. The VdF copolymer is preferably a copolymer having 40 mol % or higher of VdF because such a copolymer dissolves in a fluorine-free organic solvent. Particularly, a copolymer represented by the following formula is preferable as a polymer used in an electrode mixture in terms of good oxidation resistance and adhesion to a current collector:

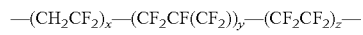

(wherein x is 40 to 85, y is 0 to 10, and z is 1 to 60, provided that x+y+z=100). More specifically, the VdF copolymer is preferably at least one selected from the group consisting of a VdF/TFE copolymer and a TFE/HFP/VdF copolymer.

Examples of the fluorine-containing acrylic or methacrylic polymers include an acrylic or methacrylic polymer having a C4 to C8 perfluoroalkyl group such as a copolymer of $CH_2$=CHCOO$(CH_2)_x$—Rf (n is an integer of 1 to 4, and Rf is a C4 to C6 perfluoroalkyl group) and a fluorine-free monomer copolymerizable therewith, and a copolymer of $CH_2$=C$(CH_3)$COO$(CH_2)_n$—Rf (n is an integer of 1 to 4, and Rf is a C4 to C6 perfluoroalkyl group) and a fluorine-free monomer copolymerizable therewith. Copolymerizing with a fluorine-free monomer is preferable because it enables easy dissolution in a fluorine-free organic solvent and good adhesion of a coating layer to be produced to a substrate. Examples of the copolymerizable fluorine-free monomer include α,β-ethylenic unsaturated carboxylic acid esters such as methyl acrylate, methyl methacrylate, ethyl acrylate, ethyl methacrylate, n-propyl acrylate, n-propyl methacrylate, isopropyl acrylate, isopropyl methacrylate, lauryl acrylate, stearyl acrylate, and benzyl acrylate; hydroxyalkyl esters of α,β-ethylenic unsaturated carboxylic acids such as 2-hydroxyethyl acrylate, 2-hydroxyethyl methacrylate, and 3-hydroxypropyl methacrylate; alkoxyalkyl esters of α,β-ethylenic unsaturated carboxylic acids such as diethylene glycol methacrylate; α,β-ethylenic unsaturated carboxylic acid amides such as acrylamide and methylol methacrylamide; α,β-ethylenic unsaturated carboxylic acids such as acrylic acid, methacrylic acid, itaconic acid, maleic anhydride, maleic acid, fumaric acid, and crotonic acid; styrene, alkyl styrenes, acrylonitrile, vinylpyrrolidone, alkyl vinyl ethers, and pyrrole.

The fluorine-free resin or rubber (B2) is not particularly limited, and can be appropriately selected according to the kind of the organic solvent (S), and the application and the production conditions of the organosol composition. Preferable examples of the fluorine-free resin include polyamideimide, polyimide, carboxymethyl cellulose or salts thereof, carboxyethyl cellulose or salts thereof, carboxybutyl cellulose or salts thereof, epoxy resin, urethane resin, polyethylene oxide or derivatives thereof, polymethacrylic acid or derivatives thereof, and polyacrylic acid or derivatives thereof. Polyamideimide and polyimide, which are resins excellent in heat resistance, are preferable as the polymer used in an electrode mixture, in the case that the fluorine-free resin has a possibility of remaining in the coating layer in the drying and heating processes after the applying process. In contrast, in the case that the fluorine-free resin can be completely removed from the coating layer in the drying and heating processes after the applying process, resins which can be easily decomposed are preferable, and preferable examples thereof include carboxymethyl cellulose or salts thereof, carboxyethyl cellulose or salts thereof, carboxybutyl cellulose or salts thereof, urethane resin, polyethylene oxide or derivatives thereof, polymethacrylic acid or derivatives thereof, and polyacrylic acid or derivatives thereof.

Examples of the fluorine-free rubber include EPDM rubber, styrene-butadiene rubber, neoprene rubber, and acrylic rubber. In the case that the fluorine-free rubber has a possibility of remaining in the coating layer, acrylic rubber is preferable as the polymer used in an electrode mixture. In the case that the fluorine-free rubber can be removed, styrene butadiene rubber is preferable.

(S) Organic Solvent

The organic solvent (S) contained in the organosol composition of the present invention is not particularly limited, provided that the solvent dissolves the polymer (B). The organic solvent (S) is appropriately selected in accordance with the kind of the polymer (B) and the application and production conditions of the organosol composition. The organic solvent (S) may be constituted by a fluorosolvent and a fluorine-free organic solvent (C).

Particularly in the case that the polymer (B) is a resin containing a fluorine atom, the organic solvent (S) is preferably a fluorosolvent. An organic solvent having a high fluorine content is preferable in that it can dissolve the polymer (B) therein. Preferable examples of the fluorosolvent include fluorine-containing ethers, fluorine-containing ketones, fluorine-containing alcohols, fluorine-containing amides, fluorine-containing esters, fluorine-containing aliphatic hydrocarbons, fluorine-containing aromatic hydrocarbons, and fluorine-containing halogenated hydrocarbons. Moreover, preferable examples of the organic solvent (S) having a high fluorine content include fluorine-containing ethers, fluorine-containing alcohols, fluorine-containing aliphatic hydrocarbons, and fluorine-containing halogenated hydrocarbons. Here, two or more fluorosolvents may be used in combination. The combination can be appropriately determined in accordance with the physical properties of the fluorosolvents.

For example, the fluorosolvent may be at least one fluorosolvent selected from C4 to C10 fluorinated hydrocarbons, heterocyclic compounds in which a part or all of the hydrogen atoms are substituted by fluorine atoms and at least one oxygen atom is included as a member of the ring, and C2 to C5 fluoroalkylamines.

(C4 to C10 Fluorinated Hydrocarbons)

Specific examples of the C4 to C10 fluorinated hydrocarbons include compounds obtained by substituting, with fluorine atom(s), a part or all of hydrogen atoms of the following hydrocarbons: n-butane, isobutane, n-pentane, isopentane, neopentane, n-hexane, isohexane, 3-methylpentane, neohexane, 2,3-dimethylbutane, n-heptane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, n-octane, 2-methylheptane 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 2-methyl-3-ethylpentane, 3-methyl-3-ethylpentane, 2,2,3-trimethylpentane, 2,2,4-trimethylpentane, 2,3,3-trimethylpentane, 2,3,4-trimethylpentane, 2,2,3,3-tetramethylbutane, n-nonane, 2-methyloctane, 3-methyloctane, 4-methyloctane, 2,4-dimethylheptane, 2,5-dimethylheptane, 2,6-dimethylheptane, 2,6-dimethylheptane, 2,2,5-trimethylhexane, 2,3,5-trimethylhexane, 3,3-diethylpentane, n-decane, 2-methylnonane, 3-methylnonane, 4-methylnonane, 5-methylnonane, 2,4-dimethyloctane, 2,5-dimethyloctane, 2,6-dimethyloctane, 2,7-dimethyloctane, 3,6-dimethyloctane, 4-propylheptane, 2,2,6-trimethylheptane, 2,4,6-trimethylheptane, 3,3,5-trimethylheptane, 3,4-diethylhexane, 2,2,3,4-tetramethylhexane, and 3,3,4,4-tetramethylhexane.

(Heterocyclic Compounds in which a Part or All of the Hydrogen Atoms are Substituted by Fluorine Atoms and at Least One Oxygen Atom is Included as a Member of the Ring)

Specific examples of the heterocyclic compounds in which apart or all of the hydrogen atoms are substituted by fluorine atoms and at least one oxygen atom is included as a member of the ring include compounds obtained by substituting, with fluorine atom(s), a part or all of hydrogen atoms of the following heterocyclic compounds: tetrahydrofuran, 2-methyltetrahydrofuran, 2-ethyltetrahydrofuran, 2-propyltetrahydrofuran, 2-butyltetrahydrofuran, tetrahydropyran, 2-methyltetrahydropyran, 2-ethyltetrahydropyran, 2-propyltetrahydropyran, 2-butyltetrahydropyran, and the like.

(C2 to C5 Fluoroalkylamines)

The C2 to C5 fluoroalkylamines are compounds obtained by substituting, with fluorine atom(s), a part or all of hydrogen atoms of alkylamines. Specific examples of such fluoroalkylamines include compounds obtained by substituting, with fluorine atom(s), a part or all of hydrogen atoms of the following alkylamines: methylamine, dimethylamine, trimethylamine, ethylamine, diethylamine, triethylamine, propylamine, dipropylamine, tripropylamine, butylamine, isobutylamine, dibutylamine, tributylamine, pentylamine, isopentylamine, dipentylamine, tripentylamine, tetrapentylamine, and tetrahexylamine.

(C) Fluorine-free Organic Solvent

The organic solvent (S) is preferably a fluorine-free organic solvent (C). The fluorine-free organic solvent (C) is not particularly limited as long as it can dissolve the polymer (B). The fluorine-free organic solvent (C) is appropriately determined according to the kind of the polymer (B), and the application and the production conditions of the organosol composition. Preferable examples thereof include ethers, ketones, alcohols, amides, esters, aliphatic hydrocarbons, aromatic hydrocarbons, and halogenated hydrocarbons. Further, in terms of good solubility of the polymer (B), the fluorine-free organic solvent (C) is more preferably at least one selected from the group consisting of ketones, alcohols, amides, esters, and aliphatic hydrocarbons.

Examples of the ketone solvents include methyl ethyl ketone, methyl propyl ketone, methyl isopropyl ketone, methyl butyl ketone, methyl isobutyl ketone, and diisobutyl ketone. Examples of the alcohol solvents include methanol, ethanol, propanol, isopropanol, n-butanol, s-butanol, and t-butanol. Examples of the amide solvents include N-methyl-2-pyrrolidone (NMP), dimethylacetamide (DMAC), and dimethylformamide (DMF). Examples of the ester solvents include ethyl acetate, isopropyl acetate, butyl acetate, and isobutyl acetate. Examples of the aliphatic hydrocarbon solvents include hexane and petroleum ether. Examples of the aromatic hydrocarbon solvents include benzene, toluene, and xylene. Examples of the halogenated hydrocarbon solvents include carbon tetrachloride and trichloroethylene. An organic solvent hardly dissolving the polymer (B) when used alone, such as carbon tetrachloride, trichloroethylene, and diisobutyl ketone, can be mixed with a small amount of oil-soluble surfactant to prepare an organosol. These solvents may be appropriately selected according to the application field or the intended use of the organosol composition of the present invention. In the case of using the organosol composition in production of electrodes of batteries, N-methyl-2-pyrrolidone is particularly preferable. Other preferable examples include dimethylacetamide. Namely, the organic solvent (S) is preferably N-methyl-2-pyrrolidone or dimethylacetamide. More preferably, the organic solvent (S) is N-methyl-2-pyrrolidone.

In the organosol composition of the present invention, the amount of the PTFE particles (A) based on the solids content is not particularly limited, and it is preferably not less than 20% by mass, more preferably not less than 30% by mass, still more preferably not less than 40% by mass, and particularly preferably not less than 50% by mass. No organosol has been conventionally known in which not less than 50% by mass of PTFE particles are stably present. In particular, the amount of the PTFE particles is more preferably 60% by mass or more, and still more preferably 80% by mass or more. Also, the amount is preferably 95% by mass or less, and more preferably 80% by mass or less in terms of prevention of the PTFE particles from agglomerating due to PTFE fibrillation by shear force of stirring in production of the organosol.

The concentration of the solids content (the PTFE particles (A) and the polymer (B) in total) in the organosol composition of the present invention may be appropriately determined according to the application and production conditions of the organosol composition. Usually, the concentration is preferably selected from the range of 1 to 40% by mass, and more preferably of 5 to 20% by mass.

In one aspect of the present invention, the PTFE organosol composition has a feature that the precipitation ratio of the PTFE particles after 48 hours is not higher than 60% when the total solids concentration of the PTFE particles (A) and the polymer (B) is 5% by mass.

Here, "the precipitation ratio of the PTFE particles after 48 hours" is determined by the following method. To a transparent glass screw tube No. 3 (volume: 10 ml, a product of Maruemu Corporation) is added 8 ml of the organosol composition having a total solids concentration of the PTFE particles (A) and the polymer (B) of 5% by mass. The organosol is irradiated with ultrasonic waves for 30 minutes by an ultrasonic cleaner of BRANSONIC (registered trademark) B-521 produced by BRANSON CLEANING EQUIPMENT COMPANY. The organosol is left to stand still for 48 hours, and then the supernatant thereof is collected and measured for the solids concentration. Using the measured concentration, the precipitation ratio of the PTFE particles (A) is determined from the following formula. Here, the polymer (B) is assumed to be completely dissolved in the organic solvent (S) in the supernatant.

PTFE precipitation ratio (%)=[{Initial PTFE concentration−(Solids concentration of supernatant after 48 hours standing still−Initial polymer (B) concentration)}/Initial PTFE concentration]×100

Initial PTFE concentration: determined from the solids concentration of the organosol composition used in the precipitation ratio test, and the composition ratio of the PTFE particles (A) and the polymer (B) in the organosol composition used in the precipitation ratio test which is measured by solid state NMR.

Solids concentration of supernatant after 48 hours standing still: determined as the ratio of the mass of the solids content to the mass of the aqueous dispersion or organosol. Here, the mass of the solids content is obtained by weighing the solids content of the supernatant collected after the still standing and heated at 150° C. for about three hours.

Initial polymer (B) concentration: determined from the solids concentration of the organosol composition used in the precipitation ratio test, and the composition ratio of the PTFE particles (A) and the polymer (B) in the organosol composition used in the precipitation ratio test which is measured by solid state NMR.

A lower precipitation ratio of the PTFE particles after 48 hours is preferable. Therefore, the precipitation ratio is not higher than 60% and more preferably not higher than 50%.

The present invention also relates to an organosol composition of PTFE particles, comprising PTFE particles (A), a polymer (B), and an organic solvent (S), wherein (1) the polymer (B) is soluble in the organic solvent (S), and (2) the organosol composition has a rate of change of saturated infrared transmittance of not higher than 5.0%, the rate of change of saturated infrared transmittance being determined from an infrared light intensity of the organosol composition having a solids concentration of 5% by mass, the infrared light intensity being measured while the organosol composition is centrifuged under conditions of an optical path length of 2.2 mm, a centrifugal force of 2300 G, and a temperature of 25° C.

In the case that the rate of change of saturated infrared transmittance is not higher than 5.0%, the dispersion stability is fine so that visible precipitation of secondary agglomerates of PTFE particles is avoided. Accordingly, the condition of the organosol composition can be kept fine during storage.

When the organosol composition has a lower dispersion stability of PTFE particles, more secondary agglomerates of PTFE particles are likely to be separated during centrifugation at a centrifugal force of 2300 G. Therefore, an organosol composition having a low dispersion stability of PTFE particles tends to have a high rate of change of saturated infrared transmittance. In the case that the rate of change of saturated infrared transmittance is higher than 5.0%, the secondary agglomerates of PTFE particles may visibly precipitate in the organosol composition, resulting in lower storage stability of the organosol composition. A detailed description is later given on the methods for determining the infrared transmittance and the rate of change of saturated infrared transmittance.

A lower rate of change of saturated infrared transmittance is preferable. Specifically, the rate of change of saturated infrared transmittance is more preferably not higher than 4.0%, still more preferably not higher than 3.0%, and particularly preferably not higher than 2.0%.

According to the organosol composition of PTFE particles of the present invention, the average rate of change of infrared transmittance from start to finish of the centrifugation is preferably not higher than 6.0% per hour. In the case that the average rate of change of infrared transmittance is not higher than 6.0% per hour, the dispersion stability is fine so that visible precipitation of secondary agglomerates of PTFE particles is avoided. Accordingly, the condition of the organosol composition can be kept fine during storage. The average rate of change of infrared transmittance is more preferably not higher than 5.0% per hour, and still more preferably not higher than 4.0% per hour.

A detailed description is later given on the method for determining the average rate of change of infrared transmittance.

The dispersion state and the particle distribution of PTFE particles in an organosol can be measured on the basis of the infrared transmittance as the organosol is centrifuged. The infrared transmittance is useful as a measure because it allows precise determination of the dispersibility of PTFE particles in an organosol. In addition, the infrared transmittance is also useful for evaluation on the storage stability of the composition because it allows evaluation using a thick solution (solids content of not lower than 1% by mass) without extreme dilution.

In the following, the method for determining the infrared transmittance, the method for determining the rate of change of saturated infrared transmittance, and the like are described in detail.

(Method for Determining Infrared Transmittance)

The infrared transmittance is obtained as follows. When infrared light (intensity: I0) at a wavelength of 870 nm is incident on the organosol composition having a solids concentration of 5% by mass, the intensity I1 of the infrared light transmitted through the organosol composition is measured. Using the obtained values and a formula (I1/I0×100), the infrared transmittance is determined.

More specifically, the infrared transmittance is determined by the following method.

First, the organosol composition of PTFE particles of the present invention is adjusted to have a total solids concentration (PTFE particles (A) and polymer (B)) of 5% by weight.

For example, an organic solvent (S) may be added to the organosol composition of the present invention to adjust the total solids concentration to 5% by weight.

A cell made of polyamide which has an optical path length of 2.2 mm (product of Nihon Rufuto Co., Ltd., model number: 110-13429, polyamide cell having an optical path length of 2.2 mm) is filled with about 0.3 ml of the organosol (sample) having a total solids concentration of 5% by weight (the cell was filled with the sample at about 20 mm height from the bottom). The cell is set in a dispersion stability analyzer (product of Nihon Rufuto Co., Ltd., trade name: "Lumisizer 611") which measures the infrared transmittance while performing centrifugation.

Then, while centrifugation is performed, the infrared light intensity I1 is measured which is the intensity of the infrared light transmitted through the sample having the above total solids concentration in the range of 0 to 25 mm height from the bottom (lower part) of the cell. Based on the measurement, the infrared transmittance [I1/I0×100] for incident infrared light (wavelength: 870 nm, intensity: I0) is determined.

The infrared transmittance is measured for 400 times at 10 second intervals from the start of measurement. Namely, measurement is performed for 4000 seconds in total.

Centrifugation is performed at a temperature of 25° C. and a centrifugation force of 2300 G.

(Method for Determining Rate of Change of Saturated Infrared Transmittance)

The rate of change of saturated infrared transmittance indicates how much the infrared transmittance has changed before and after measurements for 4000 seconds. The rate is indicated by a formula:

Rate of change of saturated infrared transmittance (%)=(|Infrared transmittance after measurements−Initial infrared transmittance|)/Initial infrared transmittance×100.

In the determination of the rate of change of saturated infrared transmittance, a value measured at the center (at a distance 120 mm apart from the rotation center of the dispersion stability analyzer) of the cell is employed as the infrared light intensity.

(Method for Determining Average Rate of Change of Infrared Transmittance)

The average rate of change of infrared transmittance is obtained as follows. Based on the measurement results of the infrared light intensity, a graph is constructed by plotting the distance from the rotation center on X axis and the infrared transmittance on Y axis with respect to each measurement time from start to finish of the measurements. The area enclosed by the graph corresponding to between the top surface and the bottom surface of the sample liquid is calculated with respect to each measurement from start to finish of the measurements. Using the obtained values, the amounts of change of the transmitted infrared light intensity in 4000 seconds from start to finish of the measurements are determined. A value determined as the amount of change per hour is regarded as the average rate of change (%/hour) of infrared transmittance.

The present invention also relates to an organosol composition of PTFE particles, comprising PTFE particles (A), a polymer (B), and an organic solvent (S), wherein (1) the polymer (B) is soluble in the organic solvent (S), and (2) the organosol composition has an ultrasonic attenuation spectrum with a slope of not less than +0.5, the ultrasonic attenuation spectrum being obtained from an attenuation factor of the organosol composition having a solids concentration of 12% by mass, the attenuation factor being measured by an ultrasonic attenuation method at a frequency of 3 to 100 MHz.

In the case that the ultrasonic attenuation spectrum has a slope of not less than +0.5, the dispersion stability is fine so that visible precipitation of secondary agglomerates of PTFE particles is avoided. Accordingly, the condition of the organosol composition can be kept fine during storage.

In the case that a large number of secondary particles that are agglomerates of PTFE primary particles are present, the particle distribution is broad and the lower-frequency attenuation factor is increased. As a result, the slope of the ultrasonic attenuation spectrum is reduced. On the other hand, in the case that a larger number of PTFE primary particles are present and a smaller number of PTFE secondary particles are present, the lower-frequency attenuation factor is relatively decreased and the higher-frequency attenuation factor is relatively increased. As a result, the slope of the ultrasonic attenuation spectrum is increased.

The slope of the ultrasonic attenuation spectrum is preferably high, more preferably not less than +0.55, still more preferably not less than +0.60, and particularly preferably not less than +0.65.

The mechanism of the ultrasonic attenuation method for determining the particle size distribution is as follows. Ultrasonic irradiation to a suspension causes relative motion of particles contained in the suspension to the solvent. The attenuation factor of sonic energy derived from the motion is measured with respect to the applied sonic energy. The particle size distribution is determined from the characteristics of the obtained attenuation factor. The ultrasonic attenuation method is most appropriately employed to determine the average particle size and the distribution pattern of particles in a thick solution. Examples of a particle size distribution measuring device utilizing the ultrasonic attenuation method include DT-1200 (trade name) supplied by Nihon Rufuto Co., Ltd.

In the ultrasonic attenuation method, a suspension to be measured is poured into a measuring chamber from the top of the chamber and the measurement is basically performed while the suspension is circulated. The circulation speed can be changed if needed. In the case of measuring a slurry that hardly forms a precipitate, measurement is performed without circulation of the slurry.

In the ultrasonic attenuation method, the suspension in the chamber is irradiated with ultrasonic waves at a frequency of 3 to 100 MHz from an oscillator installed on one side and the ultrasonic waves are then received by an oscillator installed on the other side. How much the ultrasonic waves are attenuated during transmission through the suspension (attenuation factor) is measured with respect to each of predetermined frequencies. In this manner, the attenuation curve is obtained. This curve is referred to as an ultrasonic attenuation spectrum. The shape and the slope of this ultrasonic attenuation spectrum are used in determination and evaluation of the dispersion state and particle distribution of particles in the suspension.

Specifically, the ultrasonic attenuation method may be carried out in the same manner as the method disclosed in "TAKEDA Shin-ichi, Okayama University, Shikizai, 75[11], pp. 530-537 (2002)".

More specifically, the slope of an ultrasonic attenuation spectrum is determined in accordance with the following method.

First, an organosol composition (sample) having a total solids concentration (PTFE particles (A) and polymer (B)) of 12% by weight is prepared.

For example, the organosol composition having a total solids concentration of 12% by weight may be prepared by adding an organic solvent (S) to the organosol composition of the present invention.

Next, the prepared sample is poured into an ultrasonic particle size distribution measuring apparatus (e.g. product of Nihon Rufuto Co., Ltd., trade name: DT-1200) from the top of the measuring chamber. The attenuation factor is measured at each frequency predetermined as below within a range of 3 to 100 MHz.

The predetermined frequencies are 3.0 MHz, 3.7 MHz, 4.5 MHz, 5.6 MHz, 6.8 MHz, 8.4 MHz, 10.3 MHz, 12.7 MHz, 15.6 MHz, 19.2 MHz, 23.5 MHz, 28.9 MHz, 35.5 MHz, 43.7 MHz, 53.6 MHz, 81.0 MHz, and 99.5 MHz.

The sample to be used for measurement is deaerated. For deaeration, the sample may be subject to a reduced pressure-normal pressure cycle for several times in a decompression device and then allowed to stand still for several hours. Or alternatively, the sample may be deaerated with ultrasonic irradiation or stirring under reduced pressure, and then allowed to standstill for several hours. The measurement is carried out more than once and is completed when the difference of the determined value is not higher than 5% compared to the value determined in the previous measurement at each measuring point. The determined value in the last measurement is employed. Based on the determined values at measuring points, a graph is constructed by plotting the $\log_{10}$ (frequency (MHz)) on X axis and the attenuation factor (dB/cm/MHz) on Y axis. The linear approximated curve (regression line) is determined from the measuring points by the least squares method. A slope value of the obtained line is regarded as the slope $(dB/cm/(MHz)^2)$ of the ultrasonic attenuation spectrum.

With respect to each organosol composition of the present invention, the amount of the PTFE particle (A) based on the solids content is not particularly limited, and is preferably not lower than 20% by mass, more preferably not lower than 30% by mass, still more preferably not lower than 40% by mass, and particularly preferably not lower than 50% by mass.

Moreover, the amount of the PTFE particles is more preferably not lower than 60% by mass, and still more preferably not lower than 80% by mass. From the standpoint of avoiding agglomeration of PTFE due to PTFE fibrillation by shear force of stirring in production of the organosol, the amount of the PTFE particles is preferably not higher than 95% by mass, and more preferably not higher than 80% by mass.

Meanwhile, the concentration of the solids (total of PTFE particles (A) and polymer (B)) in the organosol composition of the present invention may be appropriately selected in accordance with the application and the production conditions of the organosol composition. The concentration is usually selected from the range of 1 to 40% by mass, and preferably 5 to 20% by mass. In each organosol composition of the present invention, the PTFE particles (A), the polymer (B), and the organic solvent (S) are the same as those described above.

The organosol composition of the present invention preferably has a slope of the ultrasonic attenuation spectrum of not less than +0.50 and a change of rate of saturated infrared transmittance of not higher than 5.0%.

In each organosol composition of the present invention, the precipitation ratio of the PTFE particles after 48 hours is not higher than 60% when the total solids concentration of the PTFE particles (A) and the polymer (B) is 5% by mass.

Each organosol composition of the present invention is preferably substantially anhydrous in the case of being used in the field or application which hates water, such as use in production of lithium battery electrodes. More specifically, the water content (measured by the Karl-Fischer method, for example) is preferably not higher than 1000 ppm, more preferably not higher than 800 ppm, still more preferably not higher than 500 ppm, particularly preferably not higher than 350 ppm, and most preferably not higher than 100 ppm.

Hereinbelow, particularly preferable combinations of the components contained in the organosol composition of the present invention are listed, but the present invention is not limited to these combinations.

Example 1

(A) PTFE Particles
SSG: 2.130 to 2.200
Modification: unmodified
Fibril-forming ability: none
(B) Polymer
Type: a VdF polymer (Especially, at least one resin selected from the group consisting of PVdF, a tetrafluoroethylene/vinylidene fluoride cpolymer (VT), and a TFE-HFP-VdF copolymer (THV) is preferable. More preferable is at least one resin selected from the group consisting of VT and THV.)
(C) Fluorine-free Organic Solvent
Type: an amide solvent (NMP or DMAC, in particular)
Solids concentration: 5 to 20% by mass
Water content: not more than 100 ppm The present invention is also related to a method for producing an organosol composition of fluororesin particles (X) insoluble in an organic solvent (S). Each of the above-described organosol compositions of the PTFE particles (A) according to the present invention is preferably produced by this production method.

The production method of the present invention is a method for producing an organosol composition of fluororesin particles (X) insoluble in an organic solvent (S), the method comprising the steps of:

(I) mixing an aqueous dispersion of fluororesin particles (X) insoluble in an organic solvent (S) and an aqueous dispersion of a polymer (B) soluble in the organic solvent (S);

(II) adding a water-soluble organic solvent (D) for coagulation to the obtained mixed aqueous dispersion to coagulate the fluororesin particles (X) insoluble in the organic solvent (S) and the polymer (B);

(III) separating the obtained hydrous coagulum (E) of the fluororesin particles (X) insoluble in the organic solvent (S) and the polymer (B) from the liquid layer;

(IV) mixing and stirring the obtained hydrous coagulum (E) and the organic solvent (S) to disperse the hydrous coagulum (E); and (V) removing water from the obtained hydrous organic dispersion (F).

Examples of the fluororesin particles (X) insoluble in an organic solvent (S) include, in addition to PTFE particles, tetrafluoroethylene-hexafluoropropylene copolymer (FEP) particles, and tetrafluoroethylene-perfluoro(alkyl vinyl ether) copolymer (PFA) particles. Among these, PTFE particles are preferable.

In the following, each step is described with regard to the case that the PTFE particles (A) are used as a typical example of the fluororesin particles (X) insoluble in an organic solvent (S).

(I) Mixing Step

The aqueous dispersion of the PTFE particles (A) is preferably an aqueous dispersion that contains primary PTFE particles (particle size of 50 to 500 nm) obtained by emulsion polymerization, and the aqueous dispersion preferably has a solids concentration of 10 to 40% by mass. The aqueous dispersion of the polymer (B) is preferably an aqueous dispersion containing particles having a particle size of about 50 to 500 nm, and the aqueous dispersion preferably has a solids concentration of 10 to 40% by mass.

These two aqueous dispersions may be mixed by a common method, provided that strong stirring which may cause fibrillation of the PTFE particles (A) is avoided.

(II) Coagulation Step

The water-soluble organic solvent (D) for coagulation used in the coagulation step (II) may be as same as or different from the organic solvent (S). Examples of the organic solvent (D) for coagulation include ketones and alcohols. Examples of the ketone solvents include acetone, methyl ethyl ketone, methyl propyl ketone, methyl isopropyl ketone, methyl butyl ketone, methyl isobutyl ketone, and diisobutyl ketone. Examples of the alcohol solvents include methanol, ethanol, propanol, isopropanol, n-butanol, s-butanol, and t-butanol. Namely, these organic solvents having a relatively low boiling point are preferable.

Even in the case where the organic solvent (D) for coagulation is one usable as the organic solvent (S), the particular organic solvents respectively used in the coagulation step (II) and the dispersion step (IV) may be different from each other.

Preferable examples of the organic solvent (D) for coagulation include ketones and alcohols. In particular, ketone solvents such as acetone, methyl ethyl ketone, methyl propyl ketone, methyl isopropyl ketone, methyl butyl ketone, and methyl isobutyl ketone, and alcohol solvents such as methanol, ethanol, propanol, isopropanol, and n-butanol are particularly preferable because these solvents have a comparatively low boiling point so as to be easily removed by distillation or the like.

The amount of the organic solvent (D) for coagulation to be added is not particularly limited, provided that substantially all the PTFE particles (A) and the polymer (B) are coagulated. For example, the amount maybe about 10 to 1000 parts by mass for each 100 parts by mass of the aqueous dispersion mixture of the PTFE particles (A) and the polymer (B).

In the coagulation step (II), a hydrocarbon solvent (G) is preferably added for facilitating the following separation step (III). Examples of the hydrocarbon solvent (G) include benzene, toluene, pentane, hexane, and heptane, which are hydrocarbon solvents having a relatively low boiling point. The amount to be added may be about 1 to 100 parts by mass for each 100 parts by mass of the aqueous dispersion mixture of the PTFE particles (A) and the polymer (B).

(III) Separation Step

In this separation step, the hydrous coagulum (E) is simply separated from the liquid components (organic solvent (D) for coagulation, hydrocarbon solvent, water, and the like) so that the solids (hydrous coagulum (E)) are recovered. Therefore, the recovered coagulum still contains water and thus exists as a hydrous coagulum (E).

The separation method is not particularly limited. Since highly precise separation is not required as described above, a common method, such as a filtering method or a supernatant removal method, may be employed. In particular, a filtering method is preferable as it is easily performed.

(IV) Dispersion Step

In this step, the obtained hydrous coagulum (E) is dispersed in the organic solvent (S) that is one component of the organosol composition of the present invention so that a hydrous organic dispersion (F) is obtained. The dispersion method may be a common dispersing and mixing method, provided that strong stirring which may cause fibrillation of the PTFE particles (A) is avoided. Preferable examples of the dispersing and mixing method include mechanical stirring and ultrasonic stirring.

In the present invention, drying treatment (drying to remove liquids such as water) is not particularly required between the separation step (III) and the dispersion step (IV). In contrast, Patent Document 8 discloses that the recovered coagulum is dried and then dispersed in an organic solvent. In such a method, the PTFE primary particles are fibrillated or agglomerated into secondary particles so that a stable organosol composition having a high PTFE content is not obtained.

(V) Water Removal Step

The water removal step (V) is for removing water from the hydrous organic dispersion (F). This step is preferably carried out in the case that the composition is used in a field which hates water, such as the field of batteries. In this step, water is removed by a conventionally known method until the composition has a water content suitable for its purpose or use. Specifically, the following methods may be employed: a method of adding an organic solvent (H) azeotropic with water such that water can be removed with the organic solvent (H) by heating; a method of using an organic solvent (C) having a higher boiling point than water as a dispersing solvent such that water can be removed by distilling or condensing the dispersion; and a method of dispersing a solid, which can absorb water and can be filtered off, and then filtering off the solid such that water can be removed.

A preferable water removal method is the method of adding an organic solvent (H) azeotropic with water and then heating the mixture. Examples of the organic solvent (H) include: aromatic hydrocarbons such as benzene, toluene, xylene, mesitylene, ethylbenzene, propylbenzene, and cumene; ketones such as methyl ethyl ketone, methyl propyl ketone, methyl isopropyl ketone, methyl butyl ketone, and methyl isobutyl ketone; esters such as ethyl acetate, isopropyl acetate, butyl acetate, and isobutyl acetate; and ethers such as 1,4-dioxane. Though not particularly limited, the amount thereof may be about 1 to 50 parts by mass for each 100 parts by mass of the solution obtained in the dispersion step (IV).

The heating temperature may be appropriately determined in accordance with the azeotropic point of the organic solvent (H) and water.

The water removal is preferably performed until the dispersion becomes substantially free from water in the case that the organosol composition is to be applied to the field or aplication which hates water, such as, particularly, the case of producing electrodes for lithium batteries or capacitors. Specifically, the water content (measured by the Karl-Fischer method, for example) is preferably not higher than 1000 ppm, more preferably not higher than 800 ppm, still more preferably not higher than 500 ppm, particularly preferably not higher than 350 ppm, and most preferably not higher than 100 ppm.

Another method capable of producing the organosol composition of the present invention is, for example, a method of mixing an aqueous dispersion of PTFE particles (A) and an aqueous dispersion of a polymer (B) soluble in an organic solvent (S); adding an organic solvent (S) and an organic solvent (H) azeotropic with water thereto; removing water and the organic solvent (H) by heat distillation; and adjusting the resin solids concentration.

In the production method of the organosol composition of the present invention, the organic solvent (S) is the one described above. The organic solvent (S) is preferably a fluorine-free organic solvent (C).

Here, PTFE particles are used to explain the production method of the organosol composition according to the present invention. In addition to the PTFE particles, any perfluoro particles substantially insoluble in an organic solvent maybe also used. For example, an organosol composition may be similarly produced by using, for example, an aqueous dispersion containing FEP particles, PFA particles, or the like.

The organosol composition of the present invention stably contains a large amount of PTFE particles and is usable in a lot of applications in various fields.

In the field of batteries, for example, the organosol composition of the present invention is dispersed in NMP. Therefore, the organosol composition is usable as a binder component in an electrode mixture slurry used to produce a positive or negative electrode for lithium secondary cells or electric double layer capacitors. Further, the organosol composition is also usable as an admixture for providing water repellency to electrodes.

In the field of coating materials, the organosol composition of the present invention is usable as a covering material providing a coating layer that, for example, is excellent in slip properties, contamination resistance, and corrosion resistance, and has a low refractive index.

In the field of resin molding, the organosol composition of the present invention is usable as a modifier to be blended in a thermoplastic/thermosetting polymer or an elastomer in order to modify the characteristics such as flame retardance, sliding properties, water and oil repellency, contamination resistance, corrosion resistance, weather resistance, electric characteristics, and viscosity. Also, the organosol composition is usable as a white pigment.

For another example, the organosol composition of the present invention is usable for resin additives, sealants, printed circuit board materials required to have a low permittivity and to reduce dielectric loss, materials for belts in OA equipment such as copying machines and printers, particularly, transfer belts and transfuse belts, which are required to have non-stickiness.

EXAMPLES

The present invention is now described with reference to examples, but is not limited to these examples.

The following measuring methods are employed in Examples and Comparative Examples.

(1) Solids Concentration of Aqueous Dispersion or Organosol

An amount of 10 g of an aqueous dispersion or organosol of PTFE or the like is put in a petri dish and heated at 150° C. for about three hours. The resulting solids content is weighed, and the proportion of the mass of the solids content to the mass of the aqueous dispersion or organosol is calculated which is considered as the solids concentration.

(2) Average Particle Size

A working curve is constructed which shows the relation between the transmittance of incident light rays having a wavelength of 550 nm of a cell filled with a PTFE aqueous dispersion adjusted to a solids content of 0.15% by mass and the number average primary particle size determined by particle size measurements in a certain specific direction on a transmission electron photomicrograph, and the average primary particle size of a sample is determined, using the working curve, from the transmittance of the sample as measured in the above manner.

(3) Standard Specific Gravity [SSG]

The standard specific gravity is determined by a water displacement method in accordance with ASTM D 4895-89.

(4) Polymer Melting Point

With a DSC device (produced by SEIKO Instruments Inc.), 3 mg of each sample is measured, heated to a temperature higher than the melting point at a heating rate of 10° C./min, and then cooled at the same rate. The sample was heated again at the same rate in the second run, and the melting peak, which is to be taken as the melting point, is read.

(5) Measurement of Composition Ratio of PTFE Particles (A) to Polymer (B) in Organosol Composition by Solid State NMR The organosol composition or the hydrous coagulum (E) obtained in the separation step (III) in preparation of the organosol composition is dried in a vacuum at 120° C. The resulting sample is measured using a solid state NMR spectrometer (product of Bruker). The composition ratio is determined based on the area ratio between the PTFE-derived peak and the polymer (B)-derived peak of the obtained spectrum.

(6) Measuring Method of Infrared Transmittance of Organosol Composition (Dispersion Stability)

A cell made of polyamide with an optical path length of 2.2 mm (product of Nihon Rufuto Co., Ltd., model number: 110-13429, polyamide cell with 2.2 mm optical path length) was filled with 0.3 ml of the organosol (the cell is filled with the sample at about 20 mm height from the bottom). The cell was set in a dispersion stability analyzer (product of Nihon Rufuto Co., Ltd., trade name: "Lumisizer 611"). Then, while centrifugation was performed, the intensity I1 was measured using incident infrared light (intensity: I0) which was the intensity of the infrared light transmitted through the suspension in the range of 0 to 25 mm height from the bottom of the cell. On each measurement, the infrared transmittance (I1/I0× 100) was determined.

Centrifugation was performed at a temperature of 25° C. at a rate (4000 rpm) which can provide a centrifugal force of 2300 G. The infrared transmittance was measured for 400 times at 10 second intervals. When the rate of change of saturated infrared transmittance was measured, the measuring site of the infrared light was at a distance of 120 mm apart from the rotation center. The rate of change of saturated infrared transmittance was determined using a formula (Infrared transmittance after measurements–Initial infrared transmittance)/Initial infrared transmittance×100 (%)) based on the infrared transmittance at an optical path length of 2.2 mm.

The average rate of change of infrared transmittance was obtained as follows. Based on the measurement results of the infrared light intensity, a graph was constructed by plotting the distance from the rotation center on X axis and the infrared transmittance on Y axis with respect to each measurement time from start to finish of the measurements. The area enclosed by the graph corresponding to between the top surface and the bottom surface of the sample liquid was calculated with respect to each measurement from start to finish of the measurements. Using the obtained values, the amounts of change of the transmitted infrared light intensity in 4000 seconds from start to finish of the measurements were determined. A value determined as the amount of change per hour was regarded as the average rate of change (%/hour) of infrared transmittance.

(7) Measuring Method of Ultrasonic Attenuation Spectrum of Organosol Composition A part of the PTFE organosol composition prepared in each of the following Examples and Comparative Examples was diluted with NMP to give an organosol having a solids concentration of 12% by mass. An ultrasonic attenuation spectrum was obtained by measuring the organosol using an ultrasonic particle size distribution measuring apparatus (product of Nihon Rufuto Co., Ltd., trade name: DT-1200).

The attenuation factor was measured by the DT-1200 at each frequency predetermined as below within a range of 3 to 100 MHz. The predetermined frequencies were 3.0 MHz, 3.7 MHz, 4.5 MHz, 5.6 MHz, 6.8 MHz, 8.4 MHz, 10.3 MHz, 12.7 MHz, 15.6 MHz, 19.2 MHz, 23.5 MHz, 28.9 MHz, 35.5 MHz, 43.7 MHz, 53.6 MHz, 81.0 MHz, and 99.5 MHz. The measurement was carried out more than once on the deaerated sample, and was completed when the difference of the determined value was not higher than 5% compared to the value determined in the previous measurement at each measuring point. The determined value in the last measurement was employed. For deaeration, the sample was subject to a reduced pressure-normal pressure cycle for several times in a decompression device and then allowed to stand still for several hours. Based on the determined values at measuring points, a graph was constructed by plotting the $\log_{10}$ (frequency) on X axis and the attenuation factor (dB/cm/MHz) on Y axis. The linear approximated curve (regression line) was determined from the values at measuring points by the least squares method. "The slope of the ultrasonic attenuation spectrum" was determined from a slope of the obtained line.

Preparation Example 1

(Preparation of Aqueous Dispersion of PTFE Particles)

A 6-L SUS stainless steel polymerization vessel equipped with a stirrer was charged with 3500 g of a solution obtained by dissolving $CF_3OCF(CF_3)CF_2OCF(CF_3)COONH_4$ as an emulsifier in pure water to a concentration of 0.15% by mass, and 100 g of granular paraffin wax, and the vessel was sealed. The vessel was evacuated and replaced with nitrogen, and then evacuated. After that, tetrafluoroethylene (TFE) was fed into the vessel under stirring at 265 rpm at 85° C. until the pressure in the vessel reached 0.7 MPaG. Then, 20 g of an aqueous solution containing 525 mg of disuccinic acid peroxide (DSP) was fed into the vessel under nitrogen pressure. An amount of 20 g of water was fed again under nitrogen pressure to rinse the reaction pipe such that no solution was left in the pipe. Then, the TFE pressure was set to 0.8 MPa, the stirring was maintained at 265 rpm, and the internal temperature was maintained at 85° C. An hour after the addition of DSP, a solution obtained by dissolving 19 mg of ammonium persulfate (APS) in 20 g of pure water was added under nitrogen pressure. An amount of 20 g of water was added again under nitrogen pressure to rinse the reaction pipe such that no solution was left in the pipe. The vessel was then further added with TFE so that the internal pressure of the vessel was maintained at 0.8 MPa. The stirring was stopped when the amount of the additional monomer reached 1195 g, the gas in the vessel was blown away, and the reaction was terminated. The content of the vessel was cooled and recovered in a plastic container, so that an aqueous dispersion of PTFE (hereinafter "PTFE-1") particles was obtained. The solids concentration of the aqueous dispersion determined by a dry mass method was 31.4% by mass, and the average primary particle size of the particles in the aqueous dispersion was 0.29 μm.

In order to measure the standard specific gravity and the melting point, 500 ml of the obtained aqueous dispersion of PTFE-1 particles was diluted by deionized water until the solids concentration reached about 15% by mass. To the diluted aqueous dispersion was added 1 ml of nitric acid, and the dispersion was stirred vigorously until the dispersion was coagulated. The obtained coagulum was dried at 145° C. for 18 hours, and thereby PTFE-1 powder was obtained. The standard specific gravity [SSG] of the obtained PTFE-1 powder was measured and found to be 2.189, and the melting point analyzed by DSC was 326.9° C.

Preparation Example 2

(Preparation of Aqueous Dispersion of TFE-hexafluoropropene (HFP)-VdF Copolymer)

A 3-L SUS stainless steel polymerization vessel equipped with a stirrer was charged with a solution obtained by dissolving $F(CF_2)_5COONH_4$ and $CH_2=CFCF_2OCF(CF_3)CF_2OCF(CF_3)COONH_4$ in pure water to concentrations of 3300 ppm and 200 ppm, respectively, and the vessel was sealed. The vessel was evacuated and replaced with nitrogen, and then evacuated. Then, to the vessel was added 400 cc equivalent of ethane as a chain transfer agent through a syringe under vacuum. Then, a monomer gas mixture having a VdF/TFE/HFP composition ratio of 50/38/12 mol % was added to the vessel under stirring at 70° C. and 450 rpm until the pressure reached 0.39 MPaG. Then, an aqueous solution prepared by dissolving 137.2 mg of APS in 10 g of water was added under nitrogen pressure so as to initiate the reaction. An amount of 10 g of water was added again under nitrogen pressure such that no solution was left in the reaction pipe.

To the vessel was further added a monomer mixture having a VdF/TFE/HFP composition ratio of 60/38/2 mol % so that the internal pressure in the vessel was maintained. The stirring was slowed down when the amount of the additional monomer reached 346 g. Then, the gas in the vessel was blown away, and the reaction was terminated. The content of the vessel was cooled and 1708 g of an aqueous dispersion of VdF/TFE/HFP copolymer (hereinafter, referred to as "THV-1") particles was recovered in a container. The solids concentration of the aqueous dispersion determined by a dry mass method was 20.4% by mass. The copolymer composition determined by NMR analysis was VdF/TFE/HFP=59.0/38.9/2.1 (mol %), and the melting point analyzed by DSC was 145.9° C.

PREPARATION EXAMPLE 3

(Preparation of Aqueous Dispersion of PTFE Particles)

A 6-L SUS stainless steel polymerization vessel equipped with a stirrer was charged with 3500 g of a solution obtained by dissolving $CF_3OCF(CF_3)CF_2OCF(CF_3)COONH_4$ as an emulsifier in pure water to a concentration of 0.15% by mass and 100 g of granular paraffin wax, and the vessel was sealed. The vessel was subject to a vacuum-nitrogen replacement cycle for several times with stirring at 265 rpm. After that, the pressure inside the vessel was set to be at 0.3 MPaG nitrogen pressure. Next, the temperature inside the vessel was set to 85° C., and 20 g of an aqueous solution containing 722 mg of disuccinic acid peroxide (DSP) was added under nitrogen pressure to the vessel. An amount of 20 g of water was added again under nitrogen pressure to rinse the reaction pipe such that no solution was left in the pipe. The stirring was then kept at 265 rpm and the internal temperature was kept at 85° C. After two hours from the DSP addition, the gas in the vessel was replaced with tetrafluoroethylene (TFE) and TFE was further fed into the vessel until the pressure reached 0.7 MPaG. A solution prepared by dissolving 16 mg of ammonium persulfate (APS) in 20 g of pure water was added under nitrogen pressure to the vessel. An amount of 20 g of water was added again under nitrogen pressure to rinse the reaction pipe such that no solution was left in the pipe. Additional TFE was added to the vessel so as to maintain the pressure inside the vessel at 0.8 MPa. When the amount of the additional monomer reached 1195 g, the stirring was stopped, the gas inside the vessel was blown away, and the reaction was terminated. The content of the vessel was cooled and recovered in a plastic container. Thus, an aqueous dispersion of PTFE (hereinafter, referred to as "PTFE-2") particles was obtained. The solids concentration of the aqueous dispersion measured by a dry mass method was 31.0% by mass. The average primary particle size of the particles in the aqueous dispersion was 0.23 μm.

In order to measure the standard specific gravity and the melting point, 500 ml of the obtained aqueous dispersion of PTFE-2 particles was diluted by deionized water until the solids concentration reached about 15% by mass. To the diluted aqueous dispersion was added 1 ml of nitric acid, and the dispersion was stirred vigorously until the dispersion was coagulated. The obtained coagulum was dried at 145° C. for 18 hours, and thereby PTFE-2 powder was obtained. The standard specific gravity [SSG] of the obtained PTFE-2 powder was measured and found to be 2.199, and the melting point analyzed by DSC was 327.1° C.

Example 1

(Preparation of PTFE-1/THV-1 Organosol)

A 200-mL beaker was charged with 40.0 g of the aqueous dispersion of PTFE-1 particles obtained in Preparation Example 1 as the PTFE particles (A), 61.5 g of the aqueous dispersion of THV-1 particles obtained in Preparation Example 2 as the polymer (B), and 16 g of hexane. The mixture was stirred with a mechanical stirrer. An amount of 60 g of acetone was added while the mixture was stirred, and then stirring was performed for three minutes. After the stirring, the resulting coagulum and the supernatant mainly containing water were separated by filtering. The residual hydrous coagulum was mixed with about 150 g of NMP, and the mixture was stirred for five minutes. The mixture was then put in a 500-ml recovery flask, and the water was evaporated by an evaporator, so that 120 g of an organosol was obtained in which PTFE-1 particles were uniformly dispersed in NMP. The measured solids concentration of this organosol was 18.5% by mass, and the water content measured by the Karl-Fischer method was not higher than 100 ppm. The mass ratio of PTFE-1/THV-1 measured by solid state NMR was 53/47. Also, the organosol was left to stand still and observed by eye. The organosol showed no separated layers or particles even after 10 or more days.

Example 2

(Preparation of PTFE-1/THV-1 Organosol)

An organosol was prepared in the same manner as in Example 1 except that 40.0 g of the aqueous dispersion of PTFE-1 particles obtained in Preparation Example 1 and 41.0 g of the aqueous dispersion of THV-1 particles obtained in Preparation Example 2 were used. As a result, 145 g of an organosol in which PTFE-1 particles were uniformly dispersed in NMP was obtained. The solids concentration of this organosol was 12.5% by mass. The water content measured by the Karl-Fischer method was not higher than 100 ppm. In addition, visual observation was performed on the organosol allowed to stand still, and the results showed that no separated layers or particles were found even after 10 days or more.

Example 3

(Preparation of PTFE-1/THV-1 Organosol)

An organosol was prepared in the same manner as in Example 1 except that 40.0 g of the aqueous dispersion of PTFE-1 particles obtained in Preparation Example 1 and 15.4 g of the aqueous dispersion of THV-1 particles obtained in Preparation Example 2 were used. As a result, 72 g of an organosol in which PTFE-1 particles were uniformly dispersed in NMP was obtained. The solids concentration of this organosol was 19.5% by mass. The water content measured by the Karl-Fischer method was not higher than 100 ppm. The mass ratio of PTFE-1/THV-1 measured by solid state NMR was 81/19. In addition, visual observation was performed on the organosol allowed to stand still, and the results showed that no separated layers or particles were found even after 10 days or more.

Example 4

(Preparation of PTFE-1/THV-1 Organosol)

An organosol was prepared in the same manner as in Example 1 except that 40.0 g of the aqueous dispersion of PTFE-1 particles obtained in Preparation Example 1 and 10.4 g of the aqueous dispersion of THV-1 particles obtained in Preparation Example 2 were used. As a result, 50 g of an organosol in which PTFE-1 particles were uniformly dispersed in NMP was obtained. The solids concentration of this organosol was 27.1% by mass. The water content measured by the Karl-Fischer method was not higher than 100 ppm. In addition, visual observation was performed on the organosol allowed to stand still, and the results showed that no separated layers or particles were found even after 10 days or more.

Example 5

(Preparation of PTFE-1/THV-1 Organosol)

An organosol was prepared in the same manner as in Example 2 except that about 150 g of DMAC was used instead of NMP. As a result, 110 g of an organosol in which PTFE-1 particles were uniformly dispersed in DMAC was obtained. The solids concentration of this organosol was 16.7% by mass. The water content measured by the Karl-Fischer method was not higher than 100 ppm. In addition, visual observation was performed on the organosol allowed to stand still, and the results showed that no separated layers or particles were found even after 10 days or more.

Example 6

(Preparation of PTFE-2/THV-1 Organosol)

A 200-mL beaker was charged with 40.0 g of the aqueous dispersion of PTFE-2 particles obtained in Preparation Example 3, 41.0 g of the aqueous dispersion of THV-1 particles obtained in Preparation Example 2, and 16 g of hexane. The mixture was stirred with a mechanical stirrer. An amount of 90 g of acetone was added thereto under stirring, and the resulting mixture was further stirred for four minutes. After the stirring, the resulting coagulum and the supernatant mainly containing water were separated by filtering. An amount of about 190 g of dimethylacetamide (DMAC) was added to the residual hydrous coagulum, and the mixture was stirred for 30 minutes. The resulting mixture was placed in a 500-ml recovery flask and the water was removed by an evaporator. Thus, 158 g of an organosol in which PTFE particles were uniformly dispersed in DMAC was obtained. The solids concentration of this organosol was 12.0% by mass. The water content measured by the Karl-Fischer method was not higher than 100 ppm. The mass ratio of PTFE-2/THV-1 measured by solid state NMR was 61/39. In addition, visual observation was performed on the organosol allowed to stand still, and the results showed that no separated layers or particles were found even after 10 days or more.

Example 7

(Preparation of PTFE-2/THV-1 Organosol)

A 200-mL beaker was charged with 41.0 g of the aqueous dispersion of PTFE-2 particles obtained in Preparation Example 3, 41.0 g of the aqueous dispersion of THV-1 particles obtained in Preparation Example 2, and 19 g of hexane. The mixture was stirred with a mechanical stirrer. An amount of 95 g of acetone was added thereto under stirring, and the resulting mixture was further stirred for four minutes. After the stirring, the resulting coagulum and the supernatant mainly containing water were separated by filtering. An amount of about 190 g of DMAC was added to the residual hydrous coagulum, and the mixture was stirred for 30 minutes. The resulting mixture was placed in a 500-ml recovery flask and the water was removed by an evaporator. Thus, 162 g of an organosol in which PTFE particles were uniformly dispersed in DMAC was obtained. The solids concentration of this organosol was 12.0% by mass. The water content measured by the Karl-Fischer method was not higher than 100 ppm. The mass ratio of PTFE-2/THV-1 measured by solid state NMR was 60/40. In addition, visual observation was performed on the organosol allowed to stand still, and the results showed that no separated layers or particles were found even after 10 days or more.

Example 8

(Preparation of PTFE-2/THV-1 Organosol)

A 200-mL beaker was charged with 41.0 g of the aqueous dispersion of PTFE-2 particles obtained in Preparation Example 3, 41.0 g of the aqueous dispersion of THV-1 particles obtained in Preparation Example 2, and 19 g of hexane. The mixture was stirred with a mechanical stirrer. An amount of 95 g of acetone was added thereto under stirring, and the resulting mixture was further stirred for four minutes. After the stirring, the resulting coagulum and the supernatant mainly containing water were separated by filtering. An amount of about 190 g of NMP was added to the residual hydrous coagulum, and the mixture was stirred for 30 minutes. The resulting mixture was placed in a 500-ml recovery flask and the water was removed by an evaporator. Thus, 162 g of an organosol in which PTFE particles were uniformly dispersed in NMP was obtained. The solids concentration of this organosol was 12.0% by mass. The water content measured by the Karl-Fischer method was not higher than 100 ppm. The mass ratio of PTFE-2/THV-1 measured by solid state NMR was 61/39. In addition, visual observation was performed on the organosol allowed to stand still, and the results showed that no separated layers or particles were found even after 10 days or more.

Reference Example 1

(Preparation of PTFE-1/THV-1 Organosol)

An organosol was prepared in the same manner as in Example 1 except that 10.0 g of the aqueous dispersion of PTFE-1 particles obtained in Preparation Example 1 and 61.5 g of the aqueous dispersion of THV-1 particles obtained in Preparation Example 2 were used. As a result, 70 g of an organosol in which PTFE-1 particles were uniformly dispersed in NMP was obtained. The solids concentration of this organosol was 20.1% by mass. The water content measured by the Karl-Fischer method was not higher than 100 ppm. In addition, visual observation was performed on the organosol allowed to stand still, and the results showed that no separated layers or particles were found even after 10 days or more. From these results, the production method of the present invention produces an organosol excellent in stability even in the case that the PTFE-1 particles content is low.

Comparative Example 1

(Coagulation by Freeze Coagulation)

An amount of 5.9 g of the aqueous dispersion of PTFE-1 particles obtained in Preparation Example 1 and 35.0 g of the aqueous dispersion of THV-1 particles obtained in Preparation Example 2 were mixed to give a mixed aqueous dispersion containing PTFE-1 particles and THV-1 particles at a mass ratio of 20:80. The mixed aqueous dispersion was stored in a freezer at $-20°$ C. all night. The frozen mixture was molten at room temperature and filtered so that solid particles were separated. The solid particles were rinsed three times with deionized water at 70° C. in an amount equivalent to the amount of water in the mixed aqueous dispersion. The rinsed solid particles were dried at 90° C. for 16 hours so that PTFE-1 particles and THV-1 particles were separated by coagulation. The resulting dried mixture was a rubbery white solid. This dried mixture was dispersed in NMP so that an organosol having a solids concentration of 20% by mass was prepared. The water content measured by the Karl-Fischer method was 350 ppm. In addition, visual observation was performed on the organosol allowed to stand still, and the results showed that no separated layers or particles were found after 10 days.

Comparative Example 2

(Coagulation by Freeze Coagulation)

Freeze coagulation and drying were carried out in the same manner as in Comparative Example 1, except that a mixed aqueous dispersion containing PTFE-1 particles and THV-1 particles at a mass ratio of 50:50 was used which was prepared by mixing 20.0 g of the aqueous dispersion of PTFE-1 particles obtained in Preparation Example 1 and 30.8 g of the aqueous dispersion of THV-1 particles obtained in Preparation Example 2. The obtained dried mixture (rubbery white solid) was dispersed in NMP to prepare an organosol having a solids concentration of 20% by mass. The resulting organosol was a highly viscous, gel-like liquid. In addition, visual observation was performed on the organosol allowed to stand still, and the results showed that though separated layers were not clearly observed, particles of visible size were found after 10 days.

Comparative Example 3

(Coagulation by Freeze Coagulation)

Freeze coagulation and drying were carried out in the same manner as in Comparative Example 1, except that a mixed aqueous dispersion containing PTFE-1 particles and THV-1 particles at a mass ratio of 80:20 was used which was prepared by mixing 30.0 g of the aqueous dispersion of PTFE-1 particles obtained in Preparation Example 1 and 11.0 g of the aqueous dispersion of THV-1 particles obtained in Preparation Example 2. The obtained dried mixture (rubbery white solid) was dispersed in NMP to prepare an organosol having a solids concentration of 20% by mass. The resulting organosol was a highly viscous liquid. In addition, visual observation was performed on the organosol allowed to stand still, and the results showed that though separated layers were not clearly observed, a large number of particles of visible size were found after 10 days.

Test Example 1

(Dispersion Stability in Storage)

A part of each of the PTFE organosols prepared in Examples 1 and 3 and Comparative Examples 2 and 3 was sampled and diluted with NMP to prepare organosols having a solids concentration of 2% by mass, 5% by mass, and 10% by mass. These obtained organosols were irradiated with ultrasonic waves for 30 minutes and then allowed to stand still for 48 hours. The resulting supernatant of each organosol was collected and the solids concentration thereof was measured. Based on the results, the precipitation ratio of PTFE particles was determined. Table 1 shows the results.

TABLE 1

|  | PTFE/THV (mass ratio) | Initial solids concentration (% by mass) | Solids concentration of supernatant (% by mass) | PTFE precipitation ratio (%) |
| --- | --- | --- | --- | --- |
| Example 1 | 50/50 | 2 | 1.73 | 27 |
|  |  | 5 | 4.04 | 38 |
|  |  | 10 | — | — |
| Example 3 | 80/20 | 2 | 1.59 | 25 |
|  |  | 5 | 3.43 | 39 |
|  |  | 10 | 5.38 | 57 |
| Comparative Example 2 | 50/50 | 2 | 1.18 | 82 |
|  |  | 5 | 3.48 | 61 |
|  |  | 10 | 5.92 | 82 |
| Comparative Example 3 | 80/20 | 2 | 0.67 | 83 |
|  |  | 5 | 1.01 | 100 |
|  |  | 10 | 1.97 | 100 |

Preparation Example 4

(Preparation of PVdF Aqueous Dispersion)

A 3-L SUS stainless steel polymerization vessel equipped with a stirrer was charged with a solution obtained by dissolving $F(CF_2)_5COONH_4$ and $CH_2=CFCF_2OCF(CF_3)CF_2OCF(CF_3)COONH_4$ in pure water to concentrations of 3300 ppm and 200 ppm, respectively, and the vessel was sealed. After evacuation and nitrogen replacement, the vessel was again evacuated. Then, 48 cc equivalent of ethane as a chain transfer agent was added to the vessel through a syringe under vacuum. After that, a VdF monomer gas was fed into the vessel under stirring at 450 rpm at 80° C. until the pressure reached 1.4 MPaG. Then, an aqueous solution prepared by dissolving 205.8 mg of APS in 10 g of water was added under nitrogen pressure to the vessel so as to initiate the reaction. An amount of 10 g of water was added again under nitrogen pressure such that no solution was left in the reaction pipe.

An additional VdF monomer gas was added to the vessel so as to maintain the pressure inside the vessel. When the amount of the additional monomer reached 241 g, the stirring was slowed down, the gas inside the vessel was blown away, and the reaction was terminated. The content of the vessel was cooled and 1595 g of an aqueous dispersion of PVdF particles was recovered in a container. The solids concentration of the aqueous dispersion measured by a dry weight method was 15.8% by mass. The copolymer composition determined by NMR analysis was VdF=100.0 (mol %). The melting point analyzed by DSC was 162.8° C.

Example 9

(Preparation of PTFE/PVdF Organosol)

A 500-mL beaker was charged with 40.0 g of the aqueous dispersion of PTFE particles obtained in Preparation Example 3 as the PTFE particles (A), 79.5 g of the aqueous dispersion of PVdF particles obtained in Preparation Example 4 as the polymer (B), and 16 g of hexane. The mixture was stirred with a mechanical stirrer. An amount of 95 g of acetone was added thereto under stirring, and the resulting mixture was further stirred for 10 minutes. After the stirring, the resulting coagulum and the supernatant mainly containing water were separated by filtering. An amount of about 250 g of NMP was added to the residual hydrous coagulum, and the mixture was stirred for five minutes. The resulting mixture was placed in a 500-ml recovery flask and the water was removed by an evaporator. Thus, 164 g of an organosol in which PTFE particles were uniformly dispersed in NMP was obtained. The solids concentration of this organosol was 14.4% by mass. The water content measured by the Karl-Fischer method was not higher than 100 ppm. The mass ratio of PTFE/PVdF measured by solid state NMR was 50/50.

In addition, visual observation was performed on the organosol allowed to stand still, and the results showed that no separated layers or particles were found even after 10 days or more.

Preparation Example 5

(Preparation of Aqueous Dispersion of TFE-VdF Copolymer)

A 3-L SUS stainless steel polymerization vessel equipped with a stirrer was charged with a solution obtained by dissolving $F(CF_2)_5COONH_4$ and $CH_2=CFCF_2OCF(CF_3)CF_2OCF(CF_3)COONH_4$ in pure water to concentrations of 3300 ppm and 200 ppm, respectively, and the vessel was sealed. After evacuation and nitrogen replacement, the vessel was again evacuated. Then, 400 cc equivalent of ethane as a chain transfer agent was added to the vessel through a syringe under vacuum. After that, a monomer gas mixture containing a VdF/TFE composition ratio of 67/33 mol % was fed into the vessel under stirring at 450 rpm at 70° C. until the pressure reached 0.39 MPaG. Then, an aqueous solution prepared by dissolving 137.2 mg of APS in 10 g of water was added under nitrogen pressure so as to initiate the reaction. An amount of 10 g of water was added again under nitrogen pressure such that no solution was left in the reaction pipe.

An additional monomer mixture containing a VdF/TFE composition ratio of 67/33 mol % was added to the vessel so as to maintain the pressure inside the vessel. When the amount of the additional monomer reached 346 g, the stirring was slowed down, the gas inside the vessel was blown away, and the reaction was terminated. The content of the vessel was cooled and 1708 g of an aqueous dispersion of VdF/TFE copolymer (hereinafter, referred to as "TV-1") particles was recovered in a container. The solids concentration of the aqueous dispersion measured by a dry mass method was 20.4% by mass. The copolymer composition determined by NMR analysis was VdF/TFE=67.0/33.0 (mol %). The melting point analyzed by DSC was 145.9° C.

Example 10

(Preparation of PTFE-2/TV-1 Organosol)

A 500-mL beaker was charged with 40.0 g of the aqueous dispersion of PTFE particles obtained in Preparation Example 3 as the PTFE particles (A), 60.7 g of the aqueous dispersion of TV-1 particles obtained in Preparation Example 5 as the polymer (B), and 16 g of hexane. The mixture was stirred with a mechanical stirrer. An amount of 95 g of acetone was added thereto under stirring, and the resulting mixture was further stirred for 10 minutes. After the stirring, the resulting coagulum and the supernatant mainly containing water were separated by filtering. An amount of about 250 g of NMP was added to the residual hydrous coagulum, and the mixture was stirred for five minutes. The resulting mixture was placed in a 500-ml recovery flask and the water was removed by an evaporator. Thus, 164 g of an organosol in which PTFE particles were uniformly dispersed in NMP was obtained. The solids concentration of this organosol was 14.4% by mass. The water content measured by the Karl-Fischer method was not higher than 100 ppm. The mass ratio of PTFE/TV-1 measured by solid state NMR was 50/50. In addition, visual observation was performed on the organosol allowed to stand still, and the results showed that no separated layers or particles were found even after 10 days or more.

Example 11

(Preparation of PTFE-2/THV-1 Organosol)

A 500-mL beaker was charged with 15.0 g of the aqueous dispersion of PTFE-2 particles obtained in Preparation Example 3, 52.8 g of the aqueous dispersion of THV-1 particles obtained in Preparation Example 2, and 19 g of hexane. The mixture was stirred with a mechanical stirrer. An amount of 90 g of acetone was added thereto under stirring, and the resulting mixture was further stirred for 10 minutes. After the stirring, the resulting coagulum and the supernatant mainly containing water were separated by filtering. An amount of about 160 g of NMP was added to the residual hydrous coagulum, and the mixture was stirred for 30 minutes. The resulting mixture was placed in a 500-ml recovery flask and the water was removed by an evaporator. Thus, 112 g of an organosol in which PTFE particles were uniformly dispersed in NMP was obtained. The solids concentration of this organosol was 13.0% by mass. The water content measured by the Karl-Fischer method was not higher than 100 ppm. The mass ratio of PTFE-2/THV-1 measured by solid state NMR was 30/70. In addition, visual observation was performed on the organosol allowed to stand still, and the results showed that no separated layers or particles were found even after 10 days or more.

Example 12

(Preparation of PTFE-2/THV-1 Organosol)

A 500-mL beaker was charged with 20.0 g of the aqueous dispersion of PTFE-2 particles obtained in Preparation Example 3, 45.3 g of the aqueous dispersion of THV-1 particles obtained in Preparation Example 2, and 19 g of hexane. The mixture was stirred with a mechanical stirrer. An amount of 90 g of acetone was added thereto under stirring, and the resulting mixture was further stirred for 10 minutes. After the stirring, the resulting coagulum and the supernatant mainly containing water were separated by filtering. An amount of about 160 g of NMP was added to the residual hydrous coagulum, and the mixture was stirred for 30 minutes. The resulting mixture was placed in a 500-ml recovery flask and the water was removed by an evaporator. Thus, 113 g of an organosol in which PTFE particles were uniformly dispersed in NMP was obtained. The solids concentration of this organosol was 13.0% by mass. The water content measured by the Karl-Fischer method was not higher than 100 ppm. The mass ratio of PTFE-2/THV-1 measured by solid state NMR was 40/60. In addition, visual observation was performed on the organosol allowed to stand still, and the results showed that no separated layers or particles were found even after 10 days or more.

Example 13

(Preparation of PTFE-2/THV-1 Organosol)

A 500-mL beaker was charged with 40.0 g of the aqueous dispersion of PTFE-2 particles obtained in Preparation Example 3, 60.7 g of the aqueous dispersion of THV-1 particles obtained in Preparation Example 2, and 19 g of hexane. The mixture was stirred with a mechanical stirrer. An amount of 105 g of acetone was added thereto under stirring, and the resulting mixture was further stirred for 10 minutes. After the stirring, the resulting coagulum and the supernatant mainly containing water were separated by filtering. An amount of about 250 g of NMP was added to the residual hydrous coagulum, and the mixture was stirred for 30 minutes. The resulting mixture was placed in a 500-ml recovery flask and the water was removed by an evaporator. Thus, 176 g of an organosol in which PTFE particles were uniformly dispersed in NMP was obtained. The solids concentration of this organosol was 12.5% by mass. The water content measured by the Karl-Fischer method was not higher than 100 ppm. The mass ratio of PTFE-2/THV-1 measured by solid state NMR was 50/50. In addition, visual observation was performed on the organosol allowed to stand still, and the results showed that no separated layers or particles were found even after 10 days or more.

Example 14

(Preparation of PTFE-2/THV-1 Organosol)

A 500-mL beaker was charged with 50.0 g of the aqueous dispersion of PTFE-2 particles obtained in Preparation Example 3, 19.1 g of the aqueous dispersion of THV-1 particles obtained in Preparation Example 2, and 19 g of hexane. The mixture was stirred with a mechanical stirrer. An amount of 80 g of acetone was added thereto under stirring, and the resulting mixture was further stirred for 10 minutes. After the stirring, the resulting coagulum and the supernatant mainly containing water were separated by filtering. An amount of about 195 g of NMP was added to the residual hydrous coagulum, and the mixture was stirred for 30 minutes. The resulting mixture was placed in a 500-ml recovery flask and the water was removed by an evaporator. Thus, 132 g of an organosol in which PTFE particles were uniformly dispersed in NMP was obtained. The solids concentration of this organosol was 14.0% by mass. The water content measured by the Karl-Fischer method was not higher than 100 ppm. The mass ratio of PTFE-2/THV-1 measured by solid state NMR was 80/20. In addition, visual observation was performed on the organosol allowed to stand still, and the results showed that no separated layers or particles were found even after 10 days or more.

Example 15

(Preparation of PTFE-2/THV-1 Organosol)

A 500-mL beaker was charged with 40.0 g of the aqueous dispersion of PTFE-2 particles obtained in Preparation Example 3, 60.7 g of the aqueous dispersion of THV-1 particles obtained in Preparation Example 2, and 19 g of hexane. The mixture was stirred with a mechanical stirrer. An amount of 105 g of acetone was added thereto under stirring, and the resulting mixture was further stirred for 10 minutes. After the stirring, the resulting coagulum and the supernatant mainly containing water were separated by filtering. An amount of about 250 g of DMAC was added to the residual hydrous coagulum, and the mixture was stirred for 30 minutes. The resulting mixture was placed in a 500-ml recovery flask and the water was removed by an evaporator. Thus, 176 g of an organosol in which PTFE particles were uniformly dispersed in DMAC was obtained. The solids concentration of this organosol was 13.3% by mass. The water content measured by the Karl-Fischer method was not higher than 100 ppm. The mass ratio of PTFE-2/THV-1 measured by solid state NMR was 50/50. In addition, visual observation was performed on the organosol allowed to stand still, and the results showed that no separated layers or particles were found even after 10 days or more.

Comparative Example 4

(Coagulation by Freeze Coagulation)

An amount of 20.0 g of the aqueous dispersion of PTFE-2 particles obtained in Preparation Example 3 and 30.8 g of the aqueous dispersion of THV-1 particles obtained in Preparation Example 2 were mixed to give a mixed aqueous dispersion containing PTFE-2 particles and THV-1 particles at a mass ratio of 50:50. The mixed aqueous dispersion was stored in a freezer at −20° C. all night. The frozen mixture was molten at room temperature and filtered so that solid particles were separated. The solid particles were rinsed three times with deionized water at 70° C. in an amount equivalent to the amount of water in the mixed aqueous dispersion. The rinsed solid particles were dried at 90° C. for 16 hours. Thus, the mixture of PTFE-2 particles and THV-1 particles was coagulated, separated, and dried. The resulting dried mixture was a rubbery white solid. This dried mixture was dispersed in NMP to prepare an organosol having a solids concentration of 12% by mass. A mechanical stirrer was used to dissolve the mixture and the stirring time was 30 minutes. The water content measured by the Karl-Fischer method was 350 ppm. In addition, visual observation was performed on the organosol allowed to stand still, and the results showed that separated layers were clearly found after 10 days. Moreover, precipitation of a large number of particles of visible size was already found in preparation of the organosol.

Comparative Example 5

(Coagulation by Freeze Coagulation)

Freeze coagulation and drying were carried out in the same manner as in Comparative Example 4, except that a mixed aqueous dispersion containing PTFE-2 particles and THV-1 particles at a mass ratio of 80:20 was used which was prepared by mixing 30.0 g of the aqueous dispersion of PTFE-2 particles obtained in Preparation Example 3 and 11.0 g of the aqueous dispersion of THV-1 particles obtained in Preparation Example 2. The obtained dried mixture (rubbery white solid) was dispersed in NMP to prepare an organosol having a solids concentration of 12% by mass. However, phase separation occurred during preparation, resulting in a failure of preparation of a uniform dispersion.

Comparative Example 6

(Coagulation by Freeze Coagulation)

Freeze coagulation and drying were carried out in the same manner as in Comparative Example 4, except that a mixed aqueous dispersion containing PTFE-2 particles and THV-1 particles at a mass ratio of 50:50 was used which was prepared by mixing 20.0 g of the aqueous dispersion of PTFE-2 particles obtained in Preparation Example 3 and 30.8 g of the aqueous dispersion of THV-1 particles obtained in Preparation Example 2. The obtained dried mixture (rubbery white solid) was dispersed in DMAC to prepare an organosol having a solids concentration of 12% by mass. The resulting organosol was highly viscous gel-like liquid. In addition, visual observation was performed on this organosol allowed to stand still, and the results showed that separated layers were found after 10 days. Moreover, precipitation of a large number of particles of visible size was already found in preparation of the organosol.

Comparative Example 7

(Coagulation by Freeze Coagulation)

Freeze coagulation and drying were carried out in the same manner as in Comparative Example 4, except that a mixed aqueous dispersion containing PTFE-2 particles and THV-1 particles at a mass ratio of 40:60 was used which was prepared by mixing 20.0 g of the aqueous dispersion of PTFE-2 particles obtained in Preparation Example 3 and 45.3 g of the aqueous dispersion of THV-1 particles obtained in Preparation Example 2. The obtained dried mixture (rubbery white solid) was dispersed in DMAC to prepare an organosol having a solids concentration of 12% by mass. The resulting organosol was highly viscous gel-like liquid. In addition, visual observation was performed on this organosol allowed to stand still, and the results showed that separated layers were found after 10 days. Moreover, precipitation of a large number of particles of visible size was already found in preparation of the organosol.

Comparative Example 8

(Coagulation by Freeze Coagulation)

Freeze coagulation and drying were carried out in the same manner as in Comparative Example 4, except that a mixed aqueous dispersion containing PTFE-2 particles and THV-1 particles at a mass ratio of 30:70 was used which was prepared by mixing 15.0 g of the aqueous dispersion of PTFE-2 particles obtained in Preparation Example 3 and 52.8 g of the aqueous dispersion of THV-1 particles obtained in Preparation Example 2. The obtained dried mixture (rubbery white solid) was dispersed in DMAC to prepare an organosol having a solids concentration of 12% by mass. The resulting organosol was highly viscous gel-like liquid. In addition, visual observation was performed on this organosol allowed to stand still, and the results showed that separated layers were found after 10 days. Moreover, precipitation of a large number of particles of visible size was already found in preparation of the organosol.

Test Example 2

A part of each of the PTFE organosols prepared in Examples 11 to 13 and Comparative Examples 4, 7, and 8 was sampled and diluted with NMP to prepare an organosol having a solids concentration of 5% by mass. These obtained organosols were evaluated as described above using a dispersion stability analyzer (product of Nihon Rufuto Co., Ltd., trade name: "Lumisizer 611"). Table 2 shows the results.

Test Example 3

A part of each of the PTFE organosols prepared in Examples 11 to 14 and Comparative Examples 4, 7, and 8 was sampled and diluted with NMP to prepare an organosol having a solids concentration of 12% by mass. These obtained organosols were evaluated as described above using an ultrasonic attenuation particle size distribution measuring apparatus (product of Nihon Rufuto Co., Ltd., trade name "DT-1200"). Table 3 shows the results.

TABLE 2

| | PTFE/THV (mass ratio) | Rate of change of saturated infrared transmittance (%) | Average rate of change of infrared transmittance (%/hour) |
|---|---|---|---|
| Example 11 | 30/70 | 2.3 | 2.7 |
| Example 12 | 40/60 | 1.3 | 3.8 |
| Example 13 | 50/50 | 2.5 | 5.9 |
| Comparative Example 8 | 30/70 | 4 | 6.2 |
| Comparative Example 7 | 40/60 | 2.6 | 12.8 |
| Comparative Example 4 | 50/50 | 10.5 | 30.2 |

TABLE 3

| | PTFE/THV (mass ratio) | Slope of ultrasonic attenuation spectrum |
|---|---|---|
| Example 11 | 30/70 | 0.52 |
| Example 12 | 40/60 | 0.59 |
| Example 13 | 50/50 | 0.67 |
| Example 14 | 80/20 | 0.93 |
| Comparative Example 8 | 30/70 | 0.4 |
| Comparative Example 7 | 40/60 | 0.44 |
| Comparative Example 4 | 50/50 | 0.49 |

The invention claimed is:

1. An organosol composition of polytetrafluoroethylene particles, comprising
    polytetrafluoroethylene particles (A),
    a polymer (B), and
    an organic solvent (S),
    wherein
    (1) the polymer (B) is soluble in the organic solvent (S),
    (2) the amount of the polytetrafluoroethylene particles (A) is not lower than 50% by mass of the total amount of the polytetrafluoroethylene particles (A) and the polymer (B),
    (3) the precipitation ratio of the polytetrafluoroethylene particles after 48 hours is not higher than 60% when the total solids concentration of the polytetrafluoroethylene particles (A) and the polymer (B) is 5% by mass based on the total mass of the organosol composition, and
    (4) the amount of the polytetrafluoroethylene particles (A) based on a solids content of the organosol composition is not lower than 30% by mass.

2. An organosol composition of polytetrafluoroethylene particles, comprising
    polytetrafluoroethylene particles (A),
    a polymer (B), and
    an organic solvent (S),
    wherein
    (1) the polymer (B) is soluble in the organic solvent (S),
    (2) the organosol composition has an ultrasonic attenuation spectrum with a slope of not less than +0.50,
    the ultrasonic attenuation spectrum being obtained from an attenuation factor of the organosol composition having a solids concentration of 12% by mass based on the total mass of the organosol composition, the attenuation factor being measured by an ultrasonic attenuation method at a frequency of 3 to 100 MHz, and
    (3) the amount of the polytetrafluoroethylene particle (A) based on a solids content of the organosol composition is not lower than 30% by mass.

3. An organosol composition of polytetrafluoroethylene particles, comprising
polytetrafluoroethylene particles (A),
a polymer (B), and
an organic solvent (S),
wherein
(1) the polymer (B) is soluble in the organic solvent (S), and
(2) the organosol composition has a rate of change of saturated infrared transmittance of not higher than 5.0%, the rate of change of saturated infrared transmittance being determined from an infrared light intensity of the organosol composition having a solids concentration of 5% by mass based on the total mass of the organosol composition, the infrared light intensity being measured while the organosol composition is centrifuged under conditions of an optical path length of 2.2 mm, a centrifugal force of 2300 G, and a temperature of 25° C., and
(3) the amount of the polytetrafluoroethylene particle (A) based on a solids content of the organosol composition is not lower than 30% by mass.

4. The organosol composition of polytetrafluoroethylene particles according to claim 3,
wherein the organosol composition has an average rate of change of infrared transmittance from start to finish of the centrifugation is not higher than 6.0% per hour.

5. The organosol composition according to claim 2,
wherein the amount of the polytetrafluoroethylene particles (A) is not lower than 30% by mass of the total amount of the polytetrafluoroethylene particles (A) and the polymer (B).

6. The organosol composition according to claim 2,
wherein the amount of the polytetrafluoroethylene particles (A) is not lower than 50% by mass of the total amount of the polytetrafluoroethylene particles (A) and the polymer (B).

7. The organosol composition according to claim 1,
wherein the polytetrafluoroethylene particles (A) have a standard specific gravity of 2.130 to 2.230.

8. The organosol composition according to claim 1,
wherein the polytetrafluoroethylene particles (A) are unmodified high-molecular-weight polytetrafluoroethylene particles.

9. The organosol composition according to claim 1,
wherein the organic solvent (S) is a fluorine-free organic solvent (C).

10. The organosol composition according to claim 1,
wherein the organic solvent (S) is N-methyl-2-pyrrolidone or dimethylacetamide.

11. The organosol composition according to claim 1,
wherein the amount of the polytetrafluoroethylene particles (A) is not higher than 95% by mass of the total amount of the polytetrafluoroethylene particles (A) and the polymer (B).

12. The organosol composition according to claim 1,
wherein the polymer (B) soluble in the organic solvent (S) is a homopolymer or copolymer of vinylidene fluoride.

13. The organosol composition according to claim 1, which is used as a binder for a lithium battery electrode or a capacitor electrode.

14. A method for producing an organosol composition according to claim 1, of fluororesin particles (X) insoluble in an organic solvent (S), the method comprising the steps of:
(I) mixing an aqueous dispersion of fluororesin particles (X) insoluble in an organic solvent (S) and an aqueous dispersion of a polymer (B) soluble in the organic solvent (S);
(II) adding a water-soluble organic solvent (D) for coagulation to the obtained mixed aqueous dispersion to coagulate the fluororesin particles (X) insoluble in the organic solvent (S) and the polymer (B);
(III) separating the obtained hydrous coagulum (E) of the fluororesin particles (X) insoluble in the organic solvent (S) and the polymer (B) from the liquid layer;
(IV) mixing and stirring the obtained hydrous coagulum (E) and the organic solvent (S) to disperse the hydrous coagulum (E); and
(V) removing water from the obtained hydrous organic dispersion (F).

15. The production method according to claim 14,
wherein the fluororesin particles (X) insoluble in the organic solvent (S) are polytetrafluoroethylene particles.

16. The production method according to claim 14,
wherein the water-soluble organic solvent (D) used in the coagulation step (II) is a ketone solvent or an alcohol solvent.

17. The production method according to claim 14,
wherein a hydrocarbon solvent (G) is further added in the coagulation step (II).

18. The production method according to claim 14,
wherein the separation method carried out in the separation step (III) is filtering.

19. The production method according to claim 14,
wherein an organic solvent (H) azeotropic with water coexists in the water removal step (V).

20. The production method according to claim 14,
wherein the organic solvent (S) is a fluorine-free organic solvent (C).

21. The production method according to claim 14,
wherein the organic solvent (S) is N-methyl-2-pyrrolidone or dimethylacetamide.

22. The production method according to claim 14,
wherein the polymer (B) soluble in the organic solvent (S) is a homopolymer or copolymer of vinylidene fluoride.

23. An organosol composition of polytetrafluoroethylene particles, which is produced by the production method according to claim 14.

* * * * *